(12) United States Patent
Ramsey

(10) Patent No.: US 7,238,731 B2
(45) Date of Patent: *Jul. 3, 2007

(54) ENVIRONMENTALLY FRIENDLY COATING COMPOSITIONS FOR COATING METAL OBJECTS, COATED OBJECTS THEREFROM, AND METHODS, PROCESSES AND ASSEMBLAGES FOR COATING THEREOF

(75) Inventor: Sally Judith Weine Ramsey, Tallmadge, OH (US)

(73) Assignee: Ecology Coating, Inc., Akron, OH (US)

( * ) Notice: Subject to any disclaimer, the term of this patent is extended or adjusted under 35 U.S.C. 154(b) by 135 days.

This patent is subject to a terminal disclaimer.

(21) Appl. No.: 11/075,647

(22) Filed: Mar. 8, 2005

(65) Prior Publication Data

US 2005/0196605 A1 Sep. 8, 2005

Related U.S. Application Data

(63) Continuation-in-part of application No. 11/003,159, filed on Dec. 2, 2004, and a continuation-in-part of application No. 10/983,022, filed on Nov. 5, 2004, and a continuation-in-part of application No. 10/982,998, filed on Nov. 5, 2004.

(60) Provisional application No. 60/557,074, filed on Mar. 26, 2004, provisional application No. 60/556,221, filed on Mar. 25, 2004, provisional application No. 60/551,287, filed on Mar. 8, 2004.

(51) Int. Cl.
 C08F 2/48 (2006.01)
 C08J 3/28 (2006.01)
 B32B 9/04 (2006.01)
 B32B 9/00 (2006.01)

(52) U.S. Cl. .......... 522/90; 522/96; 522/100; 522/103; 522/104; 522/107; 522/150; 522/153; 522/152; 522/168; 522/170; 522/172; 522/174; 522/99; 522/178; 522/182; 522/181; 522/71; 522/75; 522/74; 522/77; 522/81; 428/411.1; 428/413; 428/416; 428/423.1; 428/432; 428/500

(58) Field of Classification Search .............. 522/96, 522/100, 90, 103, 104, 107, 150, 153, 152, 522/168, 170, 172, 174, 99, 178, 182, 181, 522/71, 74, 75, 77, 78, 79, 81; 428/411.1, 428/413, 416, 423.1, 432, 500
See application file for complete search history.

(56) References Cited

U.S. PATENT DOCUMENTS

| | | | | |
|---|---|---|---|---|
| 4,163,809 A | * | 8/1979 | McGinniss et al. | ......... 427/500 |
| 4,188,455 A | * | 2/1980 | Howard | .................. 428/423.1 |
| 4,210,687 A | | 7/1980 | Obendorf et al. | |
| 4,234,466 A | | 11/1980 | Takahashi et al. | |
| 4,721,734 A | | 1/1988 | Gehlhaus et al. | |
| 5,182,148 A | | 1/1993 | Kapp et al. | |
| 5,453,451 A | * | 9/1995 | Sokol | .......................... 522/42 |
| 5,733,607 A | | 3/1998 | Mangum et al. | |
| 5,773,487 A | | 6/1998 | Sokol | |
| 6,039,798 A | | 3/2000 | Aldcroft et al. | |
| 6,541,076 B2 | * | 4/2003 | Dunkle | ....................... 427/458 |
| 6,682,872 B2 | | 1/2004 | Sachdev et al. | |
| 6,784,222 B2 | * | 8/2004 | Zychowski et al. | ........... 522/80 |
| 2001/0051229 A1 | | 12/2001 | Witt | |
| 2002/0032249 A1 | | 3/2002 | Eckberg et al. | |
| 2003/0008934 A1 | * | 1/2003 | Zychowski et al. | ............ 522/7 |
| 2003/0045598 A1 | | 3/2003 | Chen et al. | |
| 2003/0138733 A1 | | 7/2003 | Sachdev et al. | |
| 2003/0185990 A1 | | 10/2003 | Bittner et al. | |
| 2003/0207959 A1 | | 11/2003 | Napadensky et al. | |
| 2004/0071949 A1 | | 4/2004 | Glatkowski et al. | |
| 2005/0170101 A1 | * | 8/2005 | Ramsey | ....................... 427/487 |
| 2005/0170280 A1 | * | 8/2005 | Ramsey | ................... 430/270.1 |

FOREIGN PATENT DOCUMENTS

WO WO 01/68375 * 9/2001

OTHER PUBLICATIONS

MSDS sheet [online] for Tint-AYD PC 9703 Phthalogreen from Elementis Specialties (Oct. 8, 1993). [retrieved on Aug. 19, 2005] Retrieved from the internet <http://www.elementis_specialties.com/index.asp?fuseaction=main.msds_results&ProdID=1731&Search=9703>.*

(Continued)

Primary Examiner—Sanza L. McClendon
(74) Attorney, Agent, or Firm—Wilson Sonsini Goodrich & Rosati

(57) ABSTRACT

Disclosed are environmentally friendly, substantially all solids coating compositions which are curable using ultraviolet and visible radiation. In addition, the disclosed coating compositions are suitable for coating flexible objects and/or objects having angular features, such as, but not limited to, flexible metal objects with angular features. In addition, methods are disclosed for coating surfaces, or at least a portion of the surfaces, and curing of the coated surface to obtain partially or fully cured coated surfaces. Furthermore, articles of manufacture incorporating fully cured coated surfaces are disclosed, including, for example leaf springs. Also disclosed are methods, processes, production lines, articles of manufacture, and factories which incorporate these environmentally friendly, substantially all solids coating compositions curable using ultraviolet and visible radiation.

19 Claims, 5 Drawing Sheets

OTHER PUBLICATIONS

European Coatings Show 2005 (Apr. 26, 2005), product presentation abstrat for Nanocryl [online], presented by Dr. Ch Rocher for Hanse Chemie. [retrieved on Aug. 19, 2005]. Retrieved from the internet<URL: http://www.european_coatings-show.de/main/d89w7zjb/e66v>.*

Dennis Kaminski, "Faster, Friendlier, and Fewer Rejects", Industrial paint and Powder Magazine, Apr. 28, 2004.

Peter Holl et al., "UV Curing—The Challenge in the Automotive Industry", in UV Curing of Automotive Coatings-State of the Art, 2004 available from RadTech.org.

Nanocryl-Nonosilica Reinforced (Meth-)Acrylates, Product Brochure, hanse chemie GmbH, 2003.

D. Breslin, et al., New Acrylated Oligomers with Enhanced Pigment Wetting Properties, available from www.Sartomer.com.

B. Yang, Studies of Pigmented UV Curable Systems by Real Time FTIR, available from www.Sartomer.com.

Economic Considerations of "True" 100% UV Curable Solids Paint and Coatings, Allied PhotoChemical, Inc., Jun. 2002.

* cited by examiner

ENVIRONMENTALLY FRIENDLY COATING COMPOSITIONS FOR COATING METAL OBJECTS, COATED OBJECTS THEREFROM, AND METHODS, PROCESSES AND ASSEMBLAGES FOR COATING THEREOF

CROSS-REFERENCE TO RELATED APPLICATIONS

This application claims the benefit of U.S. Provisional Application No. 60/551,287, filed on Mar. 8, 2004; this application also claims the benefit of U.S. Provisional Application Ser. No. 60/556,221, filed on Mar. 25, 2004; this application also claims the benefit of U.S. Provisional Application No. 60/557,074, filed on Mar. 26, 2004; this application is also a continuation-in-part-application of U.S. patent application Ser. No. 10/983,022, filed on Nov. 5, 2004, Ser. No. 10/982,998, filed on Nov. 5, 2004, and Ser. No. 11/003,159, filed on Dec. 2, 2004, the disclosures of all which are hereby incorporated by reference in their entirety.

BACKGROUND OF THE INVENTION

A variety of consumer, scientific, and industrial products incorporate various metals in a variety of forms and shapes. Coating such metal surfaces with solvent based coating can be problematic due to environmental issues stemming from evaporation of the volatile solvent. Also, such coatings can require thermal curing, resulting in the need for curing ovens, and the associated energy expenditure to operate them.

SUMMARY OF THE INVENTION

Presented herein are environmentally friendly actinic radiation curable, substantially all solids compositions and methods for coating metal objects or plastic objects. Also presented herein are environmentally friendly actinic radiation curable, substantially all solids compositions and methods for coating flexible objects, such as, by way of example only, flexible metal or plastic objects. Further presented herein are environmentally friendly actinic radiation curable, substantially all solids compositions and methods for coating object with angular features such as, by way of example only, metal or plastic objects with angular features. Further presented herein are environmentally friendly actinic radiation curable, substantially all solids compositions and methods for coating object that produce a coating, upon curing, that has improved properties, including by way of example, improved tensile strength, improved resistance to damage following elongation of the coated object, improved resistance to damage following bending the coating object, improved resistance to damage following cupping of the coated object, or a combination of any of the aforementioned improved properties. Such coating compositions produce less volatile materials, produce less waste and require less energy. Furthermore, such coating compositions may be used to produce coatings having desirable esthetic, performance and durability properties. Further presented are partially and fully cured surfaces, along with articles of manufacture incorporating fully cured surfaces.

In one aspect the actinic radiation curable, substantially all solids compositions described herein are comprised of a mixture of at least one oligomer, at least one monomer, at least one photoinitiator, and at least one nano-filler, wherein the cured composition exhibits 99+% adhesion after 10 days at 110 F. in 100% humidity, and/or a 180 degree bend around a mandrel, such as, by way of example only, a half inch mandrel. In a further embodiment, the cured composition is a coating on a metal or plastic object. In a further embodiment, the cured composition can provide a flexible, corrosion resistant, abrasion resistant and scratch resistant coating on a metal or plastic object.

In an embodiment of the aforementioned aspect, the actinic radiation curable, substantially all solids composition comprises at least one oligomer or a multiplicity of oligomers present in the mixture between about 15–45% by weight. In a further or alternative embodiments of the above aspect, the actinic radiation curable, substantially all solids composition comprises at least one monomer or a multiplicity of monomers present in the mixture between about 25–65% by weight. In further or alternative embodiments, the actinic radiation curable, substantially all solids composition comprises at least one photoinitiator or a multiplicity of photoinitiators present in the mixture between about 2–10% by weight. In a still further or alternate embodiment, the actinic radiation curable, substantially all solids composition comprises at least one nano-filler or a multiplicity of nano-fillers present in the mixture between about 0.1–25% by weight. In further or alternative embodiments of the aforementioned aspect, the actinic radiation curable, substantially all solids composition optionally comprises up to about 5% by weight of a filler or a multiplicity of fillers. In further or alternative embodiments of the aforementioned aspect, the actinic radiation curable, substantially all solids composition optionally comprises up to about 10% by weight of a polymerizable pigment dispersion or a multiplicity of polymerizable pigment dispersions. In still further or alternative embodiments of the aforementioned aspect, the actinic radiation curable, substantially all solids composition mixture comprises 15–45% percent by weight of an oligomer or a multiplicity of oligomers, and 25–65% by weight of a monomer or a multiplicity of monomers. In further or alternative embodiments of this aspect, the actinic radiation curable, substantially all solids composition comprises 15–45% percent by weight of an oligomer or a multiplicity of oligomers, 25–65% by weight a monomer or a multiplicity of monomers and 2–10% by weight of a photoinitiator or a multiplicity of photoinitiators. In still further or alternative embodiments, the actinic radiation curable, substantially all solids composition comprises 15–45% percent by weight of an oligomer or a multiplicity of oligomers, 25–65% by weight of a monomer or a multiplicity of monomers, 2–10% by weight of a photoinitiator or a multiplicity of photoinitiators, and 0.1–25% by weight of a nano-filler or a multiplicity of nano-fillers. In further or alternative embodiments, the actinic radiation curable, substantially all solids comprises 15–45% percent by weight an oligomer or a multiplicity of oligomers, 25–65% by weight of a monomer or a multiplicity of monomers, 2–10% by weight of a photoinitiator or a multiplicity of photoinitiators, 0.1–25% by weight of a nano-filler or a multiplicity of nano-fillers, and up to about 5% by weight of a filler or a multiplicity of fillers. In even further or alternative embodiments, the actinic radiation curable, substantially all solids composition comprises 15–45% percent by weight an oligomer or a multiplicity of oligomers, 30–65% by weight of a monomer or a multiplicity of monomers, 2–10% by weight of a photoinitiator or a multiplicity of photoinitiators, 0.1–5% by weight of a nano-filler or a multiplicity of nano-fillers, up to about 5% by weight of a filler or a multiplicity of fillers, and up to about 10% by weight of a polymerizable pigment dispersion or a multiplicity of polymerizable pigment dispersions; whereby the room temperature viscosity of the composition is up to about 500 centipoise.

In further or alternative embodiments of this aspect, the oligomers may be selected from a group consisting of urethane acrylates, aliphatic urethane acrylates, aliphatic urethane triacrylate/monomer blends, aliphatic urethane triacrylates blended with 1,6-hexanediol acrylates, hexafunctional urethane acrylates, siliconized urethane acrylates, aliphatic siliconized urethane acrylates, polyether acrylates, and combinations thereof. In another or alternative embodiments the monomers are selected from a group consisting of trimethylolpropane triacrylates, 2-phenoxyethyl acrylates, isobornyl acrylates, propoxylated glyceryl triacrylates, acrylate ester derivatives, methacrylate ester derivatives, acrylate ester derivatives, tripropylene glycol diacrylate, and combinations thereof.

In still further or alternative embodiments, the photoinitiators may be selected from a group consisting of diphenyl (2,4,6-trimethylbenzoyl) phosphine oxide, benzophenone, ESACURE® KTO, IRGACURE® 500, DARACUR® 1173, Lucirin® TPO, 1-hydroxycyclohexyl phenyl ketone, 2-hydroxy-2-methyl-1-phenyl-propan-1-one, 2,4,6,-trimethylbenzophenone, 4-methylbenzophenone, oligo (2-hydroxy-2-methyl-1-(4-(1-methylvinyl)phenyl)propanone), and combinations thereof. In another or alternative embodiments, the actinic radiation curable, substantially all solids composition further comprises up to about 2% of a co-photoinitiator selected from amine acrylates, thioxanthone, dimethyl ketal, benzyl methyl ketal, and combinations thereof.

In a still further or alternative embodiment, the fillers are selected from a group consisting of amorphous silicon dioxide prepared with polyethylene wax, synthetic amorphous silica with organic surface treatment, IRGANOX®, untreated amorphous silicon dioxide, alkyl quaternary bentonite, colloidal silica, acrylated colloidal silica, alumina, zirconia, zinc oxide, niobia, titania aluminum nitride, silver oxide, cerium oxides, and combinations thereof. Further, the average size of the filler particles is less than 10 micrometers, or less than 5 micrometers, or even less than 1 micrometer.

In further or alternative embodiments of the aforementioned aspect, the nano-fillers may be selected from a group consisting of nano-aluminum oxide, nano-silicon dioxide, nano-zirconium oxide, nano-zirconium dioxides, nano-silicon carbide, nano-silicon nitride, nano-sialon, nano-aluminum nitride, nano-bismuth oxide, nano-cerium oxide, nano-copper oxide, nano-iron oxide, nano-nickel titanate, nano-niobium oxide, nano-rare earth oxide, nano-silver oxide, nano-tin oxide, and nano-titanium oxide, and combinations thereof. In addition, the average size of the nano-filler particles is less than 100 nanometers.

In further or alternative embodiments, the polymerizable pigment dispersions are comprised of at least one pigment attached to an activated resin; wherein the activated resin is selected from a group consisting of acrylate resins, methacrylate resins, and vinyl resins, and the pigment is selected from a group consisting of carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red.

In further or alternative embodiments, the actinic radiation curable, substantially all solids composition is suitable for coating flexible objects, such as, by way of example only, metal or plastic objects. In further or alternative embodiments, the actinic radiation curable, substantially all solids composition is suitable for coating objects comprising angular features.

In further or alternative embodiments, the actinic radiation curable, substantially all solids composition is suitable as an uncured coating on flexible objects, such as, by way of example only, metal or plastic objects. In still further or alternative embodiment, the actinic radiation curable, substantially all solids composition is suitable as an uncured coating on objects comprising angular features.

In further or alternative embodiments, the coating may be applied to the surface of flexible objects, such as, by way of example only, metal or plastic objects, by means of spraying, brushing, rolling, dipping, blade coating, curtain coating or a combination thereof. Further, the means of spraying includes, but is not limited to, the use of a High Volume Low Pressure (HVLP) spraying systems, air-assisted/airless spraying systems, or electrostatic spraying systems. In further or alternative embodiments, the coating is applied in a single application, or in multiple applications. In further or alternative embodiments, the surfaces of flexible objects, such as, by way of example only, metal or plastic objects, are partially covered by the uncured coating, or in a still further or alternative embodiments, the surfaces of flexible objects, such as, by way of example only, metal or plastic objects, are fully covered by the uncured coating.

In further or alternative embodiments, the coating may be applied to the surface of objects comprising angular features by means of spraying, brushing, rolling, dipping, blade coating, curtain coating or a combination thereof. Further, the means of spraying includes, but is not limited to, the use of a High Volume Low Pressure (HVLP) spraying systems, air-assisted/airless spraying systems, or electrostatic spraying systems. In further or alternative embodiments, the coating is applied in a single application, or in multiple applications. In further or alternative embodiments, the surfaces of objects comprising angular features are partially covered by the uncured coating, or in still further or alternative embodiments, the surfaces of objects comprising angular features are fully covered by the uncured coating.

In further or alternative embodiments, the objects comprising angular features are flexible, and in still further or alternative embodiments, the objects comprising angular features comprise metal, ceramic, glass, wood, and/or plastic.

In further or alternative embodiments, the coated surfaces of flexible objects, such as, by way of example only, metal or plastic objects, are partially cured by exposure of uncured coated surfaces to a first source of actinic radiation. In further or alternative embodiments, the coated surfaces of flexible objects, such as, by way of example only, metal or plastic objects, are fully cured by exposure of the partially cured coated surface to a second source of actinic radiation. In further or alternative embodiments, the coated surfaces of objects comprising angular features are partially cured by exposure of uncured coated surfaces to a first source of actinic radiation. In further or alternative embodiments, the coated surfaces of objects comprising angular features are fully cured by exposure of the partially cured coated surface to a second source of actinic radiation.

In further or alternative embodiments, the fully cured coatings are flexible, adherent, hard, glossy, corrosion resistant, abrasion resistant, scratch resistant, or any combinations thereof.

In further or alternative embodiments, the actinic radiation is selected from the group consisting of visible radiation, near visible radiation, ultra-violet (UV) radiation, and combinations thereof. Further, the UV radiation is selected from the group consisting of UV-A radiation, UV-B radiation, UV-B radiation, UV-C radiation, UV-D radiation, or combinations thereof.

In further or alternative embodiments, the completely cured coated surface is part of articles of manufacture. In further or alternative embodiments, the articles of manufacture include the completely cured coated surface. In further or alternative embodiments, the article of manufacture coated may be an article of manufacture wherein at least one of its functions would be enhanced or improved by the presence of a coating which is flexible, adherent, hard, glossy, corrosion resistant, abrasion resistant, scratch resistant, or any combinations thereof. In further or alternative embodiments, the articles of manufacture are leaf springs or the undercarriage of automobiles.

In a further aspect the method for producing the actinic radiation curable, substantially all solids composition involves adding the components, for instance, by way of example only, least one oligomer, at least one monomer, at least one photoinitiator, optionally at least one co-photoinitiator, at least one nano-filler, optionally at least one filler, and optionally at least one polymerizable pigment dispersion, and using a means for mixing the components together to form a smooth composition. In further or alternative embodiments, the composition may be mixed in or transferred to a suitable container, such as, but not limited to, a can.

In another aspect are assemblages for coating at least a portion of a surface of flexible objects (by way of example only, metal or plastic objects), or objects comprising angular features, with an actinic radiation curable, substantially all solids composition comprising a means for applying to the object an actinic radiation curable, substantially all solids composition; a means for irradiating the applied coating with a first actinic radiation so as to partially cure the applied coating on the surface; and a means for irradiating the object with a second actinic radiation so as to completely cure the partially cured coating on the surface, wherein the cured composition is a flexible, corrosion resistant, abrasion resistant and scratch resistant coating with 99+% adhesion after 10 days at 110 F. in 100% humidity, and/or a 180 degree bend around a mandrel, such as, by way of example only, a half inch mandrel.

In one embodiment of such assemblages, the actinic radiation curable, substantially all solids composition is comprised of a mixture of at least one oligomer, at least one monomer, at least one photoinitiator, optionally at least one co-photoinitiator, at least one nano-filler, optionally at least one filler, and optionally at least one polymerizable pigment dispersion. In a further embodiment, the means for irradiating so as to partially cure the coated surface and the means for irradiating so as to completely cure the coated surface are located at an irradiation station so as to not require the transport of the object. In still a further embodiment, the means for applying the composition is located at an application station, wherein the object must be moved from the application station to the irradiation station. In yet a further embodiment, such assemblages further comprise a means for moving the object from the application station to the irradiation station. In still yet a further embodiment, the means for moving comprises a conveyer belt.

In further or alternative embodiments, the irradiation station comprises a means for limiting the exposure of actinic radiation to the application station. In yet further or alternative embodiment, assemblages further comprise a means for rotating the object around at least one axis. In yet further or alternative embodiment, assemblages further comprise a mounting station wherein the object to be coated is attached to a movable unit. In further embodiments, the movable unit is capable of rotating the object around at least one axis. In further or alternative embodiments, the movable unit is capable of moving the object from the application station to the irradiation station.

In still further or alternative embodiments, such assemblages further comprise a removal station wherein the completely cured coated object is removed from the movable unit. In further embodiments, the completely cured coated object does not require cooling prior to removal from the movable unit.

In further or alternative embodiments, the means for applying includes spraying means, brushing means, rolling means, dipping means, blade coating, and curtain coating means. In further embodiments, the means for applying includes a spraying means. In still further embodiments, the spraying means includes equipment for high volume low pressure (HVLP) spraying. In further or alternative embodiments, the means for applying occurs at ambient temperature. In further or alternative embodiments, the spraying means includes equipment for electrostatic spraying. In further or alternative embodiments, the spraying means includes equipment for air-assisted/airless spraying.

In further or alternative embodiments, the application station further comprises a means for reclaiming actinic radiation curable, substantially all solids composition that is non-adhering to the surface of the object. In still further embodiments, the reclaimed actinic radiation curable, substantially all solids composition is subsequently applied to a different object.

In an embodiment of such assemblages for coating at least a portion of a surface, the actinic radiation curable, substantially all solids composition comprises at least one oligomer or a multiplicity of oligomers present in the mixture between about 15–45% by weight. In a further or alternative embodiments of the above aspect, the actinic radiation curable, substantially all solids composition comprises at least one monomer or a multiplicity of monomers present in the mixture between about 25–65% by weight. In further or alternative embodiments, the actinic radiation curable, substantially all solids composition comprises at least one photoinitiator or a multiplicity of photoinitiators present in the mixture between about 2–10% by weight. In a still further or alternate embodiment, the actinic radiation curable, substantially all solids composition comprises at least one nano-filler or a multiplicity of nano-fillers present in the mixture between about 0.1–25% by weight. In further or alternative embodiments of the aforementioned aspect, the actinic radiation curable, substantially all solids composition optionally comprises up to about 5% by weight of a filler or a multiplicity of fillers. In further or alternative embodiments of the aforementioned aspect, the actinic radiation curable, substantially all solids composition optionally comprises up to about 10% by weight of a polymerizable pigment dispersion or a multiplicity of polymerizable pigment dispersions. In still further or alternative embodiments of the aforementioned aspect, the actinic radiation curable, substantially all solids composition mixture comprises 15–45% percent by weight of an oligomer or a multiplicity of oligomers, and 25–65% by weight of a monomer or a multiplicity of monomers. In further or alternative embodiments of this aspect, the actinic radiation curable, substantially all solids composition comprises 15–45% percent by weight of an oligomer or a multiplicity of oligomers, 25–65% by weight a monomer or a multiplicity of monomers and 2–10% by weight of a photoinitiator or a multiplicity of photoinitiators. In still further or alternative embodiments, the actinic radiation curable, substantially all solids composition comprises 15–45% percent by weight of an oligomer or a multiplicity of oligomers, 25–65% by weight of a monomer or a multiplicity of monomers, 2–10% by weight of a photoinitiator or a multiplicity of photoinitiators, and 0.1–25% by weight of a nano-filler or a multiplicity of nano-fillers. In further or alternative embodiments, the actinic radiation curable, substantially all solids comprises 15–45% percent by weight an oligomer or a multiplicity of oligomers, 25–65% by weight of a monomer or a multiplicity of monomers, 2–10% by weight of a photoinitiator or a multiplicity of photoinitiators, 0.1–25% by weight of a nano-filler or a multiplicity of nano-fillers, and up to about 5% by weight of a filler or a multiplicity of fillers. In even further or alternative embodiments, the actinic radiation curable, substantially all solids composition comprises 15–45% percent by weight an oligomer or a multiplicity of oligomers, 30–65% by weight of a monomer or a multiplicity of monomers, 2–10% by weight of a photoinitiator or a multiplicity of photoinitiators, 0.1–5% by weight of a nano-filler or a multiplicity of nano-fillers, up to about 5% by weight of a filler or a multiplicity of fillers, and up to about 10% by weight of a polymerizable pigment dispersion or a multiplicity of polymerizable pigment dispersions; whereby the room temperature viscosity of the composition is up to about 500 centipoise.

In further or alternative embodiments, the first actinic radiation of the assemblage for coating at least a portion of a surface includes actinic radiation selected from the group consisting of visible radiation, near visible radiation, ultraviolet (UV) radiation, and combinations thereof. In further or alternative embodiments, the second actinic radiation of the assemblage for coating at least a portion of a surface includes actinic radiation selected from the group consisting of visible radiation, near visible radiation, ultra-violet (UV) radiation, and combinations thereof. In further or alternative embodiments, the irradiation station includes an arrangement of mirrors.

In further or alternative embodiments of this aspect, the objects being coated are leaf springs.

In another aspect are processes for coating a at least a portion of surface of flexible objects (by way of example only, metal or plastic objects), or objects comprising angular features, with an actinic radiation curable, substantially all solids composition comprising attaching the object onto a conveying means; applying an actinic radiation curable composition at an application station onto the surface of the object; moving the coated object via the conveying means to an irradiation station; irradiating and partially curing the coated surface at the irradiation station with a first actinic radiation; and irradiating and completely curing the coated surface at the irradiation station with a second actinic radiation; wherein the cured composition is a flexible, corrosion resistant, abrasion resistant and scratch resistant coating with 99+% adhesion after 10 days at 110 F. in 100% humidity, and/or a 180 degree bend around a mandrel, such as, by way of example only, a half inch mandrel.

In further embodiments, such processes further comprise attaching the object to a rotatable spindle prior to the application step. In further or alternative embodiments, such processes further comprise moving the conveying means after attaching the object to the rotatable spindle so as to locate the object near an application station. In further embodiments, such processes further comprise applying an actinic radiation curable composition at the application station as the spindle holding the object rotates. In further embodiments, the conveying means comprises a conveyer belt.

In further or alternative embodiments, the irradiation station comprises a curing chamber containing a first actinic radiation source and a second actinic radiation source.

In further embodiments, such processes further comprise moving the completely cured coated object via the conveying means outside the curing chamber wherein the coated object is packed for storage or shipment.

In one embodiment of such processes for coating at least a portion of a surface, the actinic radiation curable, substantially all solids composition may comprise comprises at least one oligomer or a multiplicity of oligomers present in the mixture between about 15–45% by weight. In a further or alternative embodiments of the above aspect, the actinic radiation curable, substantially all solids composition comprises at least one monomer or a multiplicity of monomers present in the mixture between about 25–65% by weight. In further or alternative embodiments, the actinic radiation curable, substantially all solids composition comprises at least one photoinitiator or a multiplicity of photoinitiators present in the mixture between about 2–10% by weight. In a still further or alternate embodiment, the actinic radiation curable, substantially all solids composition comprises at least one nano-filler or a multiplicity of nano-fillers present in the mixture between about 0.1–25% by weight. In further or alternative embodiments of the aforementioned aspect, the actinic radiation curable, substantially all solids composition optionally comprises up to about 5% by weight of a filler or a multiplicity of fillers. In further or alternative embodiments of the aforementioned aspect, the actinic radiation curable, substantially all solids composition optionally comprises up to about 10% by weight of a polymerizable pigment dispersion or a multiplicity of polymerizable pigment dispersions. In still further or alternative embodiments of the aforementioned aspect, the actinic radiation curable, substantially all solids composition mixture comprises 15–45% percent by weight of an oligomer or a multiplicity of oligomers, and 25–65% by weight of a monomer or a multiplicity of monomers. In further or alternative embodiments of this aspect, the actinic radiation curable, substantially all solids composition comprises 15–45% percent by weight of an oligomer or a multiplicity of oligomers, 25–65% by weight a monomer or a multiplicity of monomers and 2–10% by weight of a photoinitiator or a multiplicity of photoinitiators. In still further or alternative embodiments, the actinic radiation curable, substantially all solids composition comprises 15–45% percent by weight of an oligomer or a multiplicity of oligomers, 25–65% by weight of a monomer or a multiplicity of monomers, 2–10% by weight of a photoinitiator or a multiplicity of photoinitiators, and 0.1–25% by weight of a nano-filler or a multiplicity of nano-fillers. In further or alternative embodiments, the actinic radiation curable, substantially all solids comprises 15–45% percent by weight an oligomer or a multiplicity of oligomers, 25–65% by weight of a monomer or a multiplicity of monomers, 2–10% by weight of a photoinitiator or a multiplicity of photoinitiators, 0.1–25% by weight of a nano-filler or a multiplicity of nano-fillers, and up to about 5% by weight of a filler or a multiplicity of fillers. In even further or alternative embodiments, the actinic radiation curable, substantially all solids composition comprises 15–45% percent by weight an oligomer or a multiplicity of oligomers, 30–65% by weight of a monomer or a multiplicity of monomers, 2–10% by weight of a photoinitiator or a multiplicity of photoinitiators, 0.1–5% by weight of a nano-filler or a multiplicity of nano-fillers, up to about 5% by weight of a filler or a multiplicity of fillers, and up to about 10% by weight of a polymerizable pigment dispersion or a multiplicity of polymerizable pigment dispersions; whereby the room temperature viscosity of the composition is up to about 500 centipoise.

In further or alternative embodiments, the application station comprises equipment for electrostatic spray. In further or alternative embodiments, the application station comprises equipment suitable for air-assisted/airless spraying. In further or alternative embodiments, the application station comprises equipment suitable for High Volume Low Pressure (HVLP) coatings application. In either case, further or alternative embodiments include processes wherein the coating is applied in a single application, or the coating is applied in multiple applications. Further, in either case, further or alternative embodiments include processes wherein the surface is partially covered by the coating, or the surface is fully covered by the coating.

In further or alternative embodiments, the time between the first actinic radiation step and the second actinic radiation step is less than 5 minutes. In further embodiments, the time between the first actinic radiation step and the second actinic radiation step is less than 1 minute. In further embodiments, the time between the first actinic radiation step and the second actinic radiation step is less than 15 seconds.

In further or alternative embodiments, the length of time of the first actinic radiation step is shorter than the length of time of the second actinic radiation step. In further or alternative embodiments, the length of time of the first actinic radiation step is longer than the length of time of the second actinic radiation step. In further or alternative embodiments, the length of time of the first actinic radiation step is identical to the length of time of the second actinic radiation step.

In further or alternative embodiments, the irradiation station includes at least one light capable of providing actinic radiation selected from the group consisting of visible radiation, near visible radiation, ultra-violet (UV) radiation, and combinations thereof.

In further or alternative embodiments, the irradiation station includes at least one light source capable of providing actinic radiation selected from the group consisting of UV-A radiation, UV-B radiation, UV-B radiation, UV-C radiation, UV-D radiation, or combinations thereof.

In further or alternative embodiments, the irradiation station includes an arrangement of mirrors such that the coated surface is cured in three dimensions. In further or alternative embodiments, the irradiation station includes an arrangement of light sources such that the coated surface is cured in three dimensions. In further embodiments, each light source emits different spectral wavelength ranges. In further embodiments, the different light sources have partially overlapping spectral wavelength ranges.

In another aspect are production lines for coating at least a portion of a surface of flexible objects (by way of example only, metal or plastic objects), or objects comprising angular features, with an actinic radiation curable, substantially all solids composition comprising a process comprising attaching the object onto a conveying means; applying an actinic radiation curable composition at an application station onto the surface of the object; moving the coated object via the conveying means to an irradiation station; irradiating and partially curing the coated surface at the irradiation station with a first actinic radiation; and irradiating and completely curing the coated surface at the irradiation station with a second actinic radiation; wherein the cured composition is a flexible, corrosion resistant, abrasion resistant and scratch resistant coating with 99+% adhesion after 10 days at 110 F. in 100% humidity, and/or a 180 degree bend around a mandrel, such as, by way of example only, a half inch mandrel.

In another aspect are facilities or factories for producing objects coated at least in part with an actinic radiation cured substantially all solids composition comprising at least one production line for coating a surface of an object with an actinic radiation curable, substantially all solids composition comprising a process comprising attaching the object onto a conveying means; applying an actinic radiation curable composition at an application station onto the surface of the object; moving the coated object via the conveying means to an irradiation station; irradiating and partially curing the coated surface at the irradiation station with a first actinic radiation; and irradiating and completely curing the coated surface at the irradiation station with a second actinic radiation; wherein the cured composition is a flexible, corrosion resistant, abrasion resistant and scratch resistant coating with 99+% adhesion after 10 days at 110 F. in 100% humidity, and/or a 180 degree bend around a mandrel, such as, by way of example only, a half inch mandrel.

INCORPORATION BY REFERENCE

All publications, patents and patent applications mentioned in this specification are herein incorporated by reference in their entirety to the same extent as if each individual publication, patent or patent application was specifically and individually indicated to be incorporated by reference.

BRIEF DESCRIPTION OF THE FIGURES

A better understanding of the features and advantages of the present methods and compositions may be obtained by reference to the following detailed description that sets forth illustrative embodiments, in which the principles of our methods, compositions, devices and apparatuses are utilized, and the accompanying drawings of which.

DETAILED DESCRIPTION OF THE INVENTION

Figure 1:
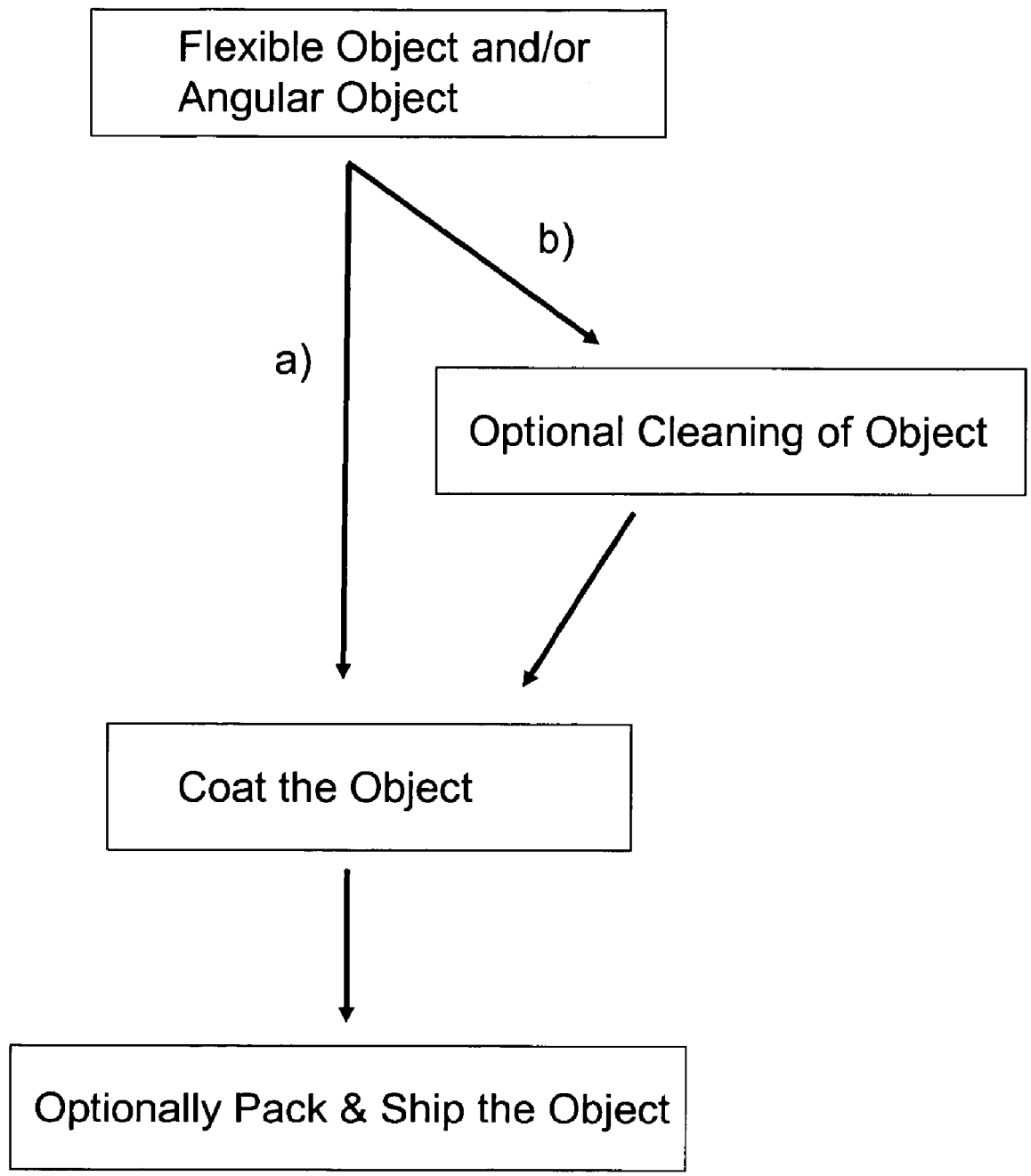
FIG. 1 is a flowchart of one possible process for coating a flexible object and/or an angular object with the coating compositions described herein.

The 100% solids, actinic radiation curable coating compositions, methods of applying the compositions, coated surfaces and coated articles described herein, materially enhance the quality of the environment by incorporation of components which are zero or near zero volatile organic compounds (VOC's). Further, such components are essentially non-volatile and therefore have zero or near zero emissions. Such a decrease in emissions significantly decreases air pollution, especially in comparison to the air pollution encountered with coating composition using volatile solvents. In addition, any water and soil pollution associated with waste disposal from processes using coating composition using volatile solvents is minimized using the methods described herein, thereby further contributing to and materially enhancing the quality of the environment. Furthermore, the 100% solids, actinic radiation curable coating compositions, methods, processes and assemblages for applying the compositions, coated surfaces and coated articles described herein, utilize significantly less energy than processes using coating composition using volatile solvents or water as a solvent, thereby conserving energy.

Glossary of Certain Terms

The term "abrasion resistance" as used herein, refers to the ability of a material to resist damage that can lead to visible, deep or wide trenches. Thus, scratches are generally regarded as being more severe than what is referred to in the art as mar.

The term "actinic radiation" as used herein, refers to any radiation source which can produce polymerization reactions, such as, by way of example only, ultraviolet radiation, near ultraviolet radiation, and visible light.

The term "angular feature" as used herein, refers to features which have varying angles and dimensions, such as, by way of example only, corners of varying angles and dimensions. Angular features also include three dimensional features, such as, by way of example only, bumps, channels, grooves, lips, edges, and protrusions.

The term "co-photoinitiator," as used herein, refers to a photoinitiator which may be combined with another photoinitiator or photoinitiators.

The term "corrosion inhibitor", as used herein, refers to an agent or agents which inhibit, or partially inhibit corrosion.

The term "corrosion resistance" as used herein, refers to the ability of a material to resist oxidation damage.

The term "cure," as used herein, refers to polymerization, at least in part, of a coating composition.

The term "curable," as used herein, refers to a coating composition which is able to polymerize at least in part.

The term "curing booster", as used herein, refers to an agent or agents which boost or otherwise enhance, or partially enhance, the curing process.

The term "filler" refers to a relatively inert substance, added to modify the physical, mechanical, thermal, or electrical properties of a coating.

The term "flexible", as used herein, refers to the ability to bend, twist, or compress without breaking, and the object can optionally return back to a portion of its original shape or position.

The term "inorganic pigment", as used herein, refers to ingredients which are particulate and substantially nonvolatile in use, and includes those ingredients typically labeled as inerts, extenders, fillers or the like in the paint and plastic trade.

The term "irradiating," as used herein, refers to exposing a surface to actinic radiation.

The term "milling" as used herein, refers to the processes of premixing, melting and grinding a powder coating formulation to obtain a powder suitable for spraying.

The term "monomers," as used herein, refers to substances containing single molecules that can link to oligomers and to each other.

The term "motor vehicle", as used herein, refers to any vehicle which is self-propelled by mechanical or electrical power. Motor vehicles, by way of example only, include automobiles, buses, trucks, tractors, recreational vehicles, and off-road vehicles.

The term "oligomers," as used herein, refers to molecules containing several repeats of a single molecule.

The term "photoinitiators," as used herein, refers to compounds that absorb ultra-violet light and use the energy of that light to promote the formation of a dry layer of coating.

The term "polymerizable pigment dispersions," as used herein, refers to pigments attached to polymerizable resins which are dispersed in a coating composition.

The term "polymerizable resin" or "activated resin," as used herein, refers to resins which possess reactive functional groups.

The term "pigment," as used herein, refers to compounds which are insoluble or partially soluble, and are used to impart color.

The term "scratch" as used herein, refers to physical deformations resulting from mechanical or chemical abrasion."

The term "vehicle" as used herein, refers to the liquid portion of solvent based formulations, and can incorporate both the solvent and the resin.

Coatings

In general, solvent-based coating formulations incorporate four basic types of materials: pigment, resin (binder), solvent, and additives. Homogeneous pigment dispersions can be created by efficient mixing of insoluble raw pigment particle in the vehicle, and thereby create opaque coatings. The resin makes up the non-volatile portion of the vehicle, and aids in adhesion, determines coating cohesiveness, affects gloss, and provides resistance to chemicals, water, and acids/bases. Three types of resins are generally used: multiuse resins (acrylics, vinyls, urethanes, polyesters); thermoset resins (alkyds, epoxides); and oils. The type of solvent used in such formulations depends on the resin and is either an organic solvent (such as alcohols, esters, ketones, glycol ethers, methylene chloride, trichloroethane, and petroleum distillates), or water. Organic solvents are used to thin/dilute the coating compositions and act to evenly disperse the paint composition over the surface and then evaporate quickly. However, due to their high volatility such organic solvents create high emission concentrations and are therefore classified as Volatile Organic Compounds (VOC's) and Hazardous Air Pollutants (HAP's). These solvent emissions are of concern to employers and employees in facilities in which such VOC's and HAP's are used, as overexposure can cause renal damage or other health related difficulties. In addition, environmental impact, and potential fire hazards are other issues to consider when using coatings which incorporate organic solvents. Furthermore, coatings which incorporate organic solvents require large curing ovens to initiate curing of the coating and to remove the solvent. All of these issues require a significant financial commitment from the coating end user, in terms of leasing or purchasing space for the large ovens, the cost of energy associated with the thermal curing process, possible medical expenses, potential environmental cleanup, and insurance premiums.

Thermoset Powder Coatings and UV-curable Powder Coating

Powder-based coating compositions and aqueous-based formulations were developed to address the issue of volatile emissions associated with non-aqueous solvent-based coating compositions. Powder-based coatings, which can include thermoset or UV-cure formulations, may decrease emissions, however due to the need for thermal melting, smoothing and curing (for thermoset powders), such powder-based coatings also require considerable time, space for large ovens, and energy. In addition, powder coatings also often display an "orange peel" appearance that may be undesirable. Solid resins which possess UV-reactive moieties, and retain the melt and flow characteristics needed to produce high quality coatings, allow for the creation of UV-curable powder coatings. These powder coatings combine the low energy, space efficient and fast cure characteristics observed with UV curing, with the convenience of powder coating application, such as electrostatic spraying. The use of UV curing effectively separates the melt and flow stages from the curing stage, however, there still remains the requirement of large ovens for the melt and flow stages, and the associated cost and space requirements needed to operate such ovens.

100% Solids, UV-curable Coating

Described herein are sprayable, 100% solids compositions, methods of using the compositions for coating surfaces, and the processes of coating surfaces. The 100% solids coating compositions described herein comprise actinic radiation curable materials (by way of example, monomers and oligomers), photoinitiators, solid pigment dispersions, adhesion promoters, nano-fillers, and fillers for the coating of surfaces of flexible objects (by way of example only, metal or plastic objects), or objects comprising angular features, and which may be sprayed by conventional methods, including, but not limited to, HVLP, air-assisted/airless, or electrostatic bell in one coat, with no additional heat applied. In addition, the 100% solids coating compositions described herein impart flexibility, corrosion resistance, abrasion resistance, improved gloss, improved adhesion, and can be either opaque or have a clear coat finish.

The 100% solids UV-curable coating compositions described herein do not use added solvent. This is achieved, in part, by the use of low molecular weight monomers which take the place of organic solvents. However, these monomers are not as volatile as organic solvents, and therefore do not evaporate as readily as volatile organic solvents. Also, in contrast to volatile organic solvent, such monomers become an integral component of the final coating and contribute to the final coating properties and characteristics. The 100% solids coating compositions described herein are easily applied to surfaces and cure quickly by exposure to UV, without the use of large curing and drying ovens; thereby, decreasing production costs associated with owning/leasing space required for drying/curing ovens, along with the energy cost associated with the operation of drying/curing ovens. In addition, a more efficient production process occurs because UV-curable coating compositions can be applied in a single coating (i.e. one-coat), which decreases the coating time and allows for immediate "pack and ship" capabilities. Also, the lack of volatile organic solvents in such UV-curable coating compositions limits health, safety, and environmental risks posed by such solvents.

The 100% solids, UV-curable coating compositions described herein can be used to coat flexible objects, such as, by way of example only, metal or plastic objects, or to coat surfaces of flexible objects, such as, by way of example only, metal or plastic objects, or to coat flexible objects comprised of metallic or plastic components. In addition, the 100% solids, UV-curable coating compositions described herein can be used to coat objects comprising angular features, such as, by way of example only, metal or plastic objects, or to coat flexible objects comprising angular features, such as, by way of example only, metal or plastic objects.

The type of metal which may be coated using the 100% solids, UV-curable coating compositions described herein includes, but is not limited to, ferrous metals and alloys (such as steel and pig iron), brass, bronze, aluminum, cobalt, copper, magnesium, nickel, titanium, tin or zinc, or alloys comprising aluminum, iron, cobalt, copper, magnesium, nickel, titanium, tin and/or zinc, plus galvanized steel, and electrogalvanized steel. In addition, the compositions described herein can be used to coat any known form of metal, such as, but not limited to, cold-rolled metal, extrusions, coil, welded parts, or cast parts. Metal surfaces, in particular, are easily oxidized to form surface oxides, herein referred to as rust, surface oxides or metal oxides. However, other metal such as brass, bronze, aluminum, cobalt, copper, magnesium, nickel, titanium, tin or zinc, or alloys comprising aluminum, iron, cobalt, copper, magnesium, nickel, titanium, tin and/or zinc also oxidize and form their corresponding surface oxides. Rust formation becomes even more likely and occurs more quickly in environments having high humidity or salt content. Thus some protective coating is needed to minimize the formation of surface oxides on metal surfaces. The resulting coatings obtained from the compositions described herein exhibits improved adhesion on metal surfaces and provide increased corrosion resistance and abrasion resistance for the coated metal.

When water based compositions are used to coat metal surfaces, the metal surfaces can oxidize as the water evaporates during the coating, curing and drying stages by a process known as "flash-rusting". Although it is possible to reduce or eliminate the formation of flash rust with waterborne coating compositions by drying with hot air blowers or the use of vacuum systems, there is no added benefit with respect to decreasing energy costs, and there remains the need for large drying ovens. In contrast, the 100% solids, UV-curable coating compositions described herein do not utilize a solvent, including water, and therefore avoids the potential for flash-rust formation. In addition, the use of such UV-curable compositions decreases the curing process time, which may avoid flash-rust formation in higher humidity environments.

The 100% solids, UV-curable coating compositions described herein use either raw pigments or solid polymerizable pigment dispersions to impart opacity to the composition and the resulting coating. Solid polymerizable pigment dispersions limit the need for "milling," as required with raw pigments. Milling refers to the manufacture processes of premixing, melting and grinding raw pigments or powder compositions into a fine powder suitable for spraying onto a surface, or mixing into a composition. The addition of these steps to the process results in increased time and energy expenditures per article of manufacture coated. Although raw pigments can be incorporated into the compositions described herein, the replacement of raw pigments with polymerizable pigment dispersions streamlines the coating process and removes the associated milling costs, thus improving overall productivity and lowering business expenditures.

Pigment color properties such as strength, transparency/opacity, gloss, shade, rheology, and light and chemical stability, are generally affected to a greater or lesser extent by the size and distribution of the pigment particles in the vehicle in which they are embedded. Pigment particles normally exist in the form of primary particles (50 µm to 500

μm), aggregates, agglomerates and flocculates. Primary particles are individual crystals, whereas aggregate are collections of primary particles bound together at their crystal faces, and agglomerates are a looser type of arrangement with primary particles and aggregates joined at corners and edges. Flocculates consist of primary particle aggregates and agglomerates generally arranged in a fairly open structure, which can be broken down in shear. However, after the shear is removed, or a dispersion is allowed to stand undisturbed, the flocculates can reform. The relationship between pigment particle size and the ability of a pigment vehicle system to absorb visible electromagnetic radiation is referred to as the color or tinctorial strength. The ability of a given pigment to absorb light (tinctorial strength) increases with decreasing particle diameter, and accordingly increased surface area. Thus, the ability to maintain the pigment at a minimum pigment particle size will yield a maximum tinctorial strength. The primary purpose of a dispersion is to break down pigment aggregates and agglomerates into the primary particles, and therefore achieve optimal benefits of a pigment both visually and economically. When used in a coating composition pigment dispersions exhibit increased tinctorial strength and provide enhanced gloss. However, of concern in obtaining an optimal dispersion is the number of processes involved in creating the pigment dispersion, such as agitating, shearing, milling, and grinding. If these processes are not accurately controlled then the possibility exists for batch-to-batch color variation and poor color reproducibility. Alternatively, polymerizable pigment dispersions, which exhibit minimal aggregation and agglomeration, are simply mixed into the coating composition and thereby improve color reproducibility by removing the need for these processes in the manufacturing and/or coating process. Furthermore, due to the reactive functionality of the polymerizable pigment dispersion, during polymerization the pigment becomes an integral part of the resulting coating because it is attached to the reactive functionality. This may impart greater color stability relative to pigment dispersions which simply entrap the pigment particles in the coating matrix. Thus, coatings which incorporate polymerizable pigment dispersions exhibit improved color reproducibility, and improved color stability, greater tinctorial strength and enhanced opacity and gloss. By way of example only, compositions described herein are heavily pigmented and can exhibit acceptable opacity at thicknesses less than 50 microns.

The incorporation of various higher vapor pressure monomers/resins as the vehicle in the 100% solids, UV curable compositions described herein, effectively eliminates the need for organic solvents and the associated solvent emission/evaporation issues. Consequently, this obviates the need to incorporate air pollution/emission control technology into the manufacturing process. As a result, the methods and compositions described herein can minimize the time, space and money for maintenance of air pollution control systems in an operation in which a coating step is integrated.

An additional advantage resulting from using the methods and compositions described herein is that such compositions and methods result in the overall decrease in time required to apply, cure, and dry the coating. Although, conventional coating processes can be adapted to the coating compositions and methods described herein, the use of UV radiation, rather than heat, to initiate the polymerization process significantly decreases the curing time per article coated. However, the methods and compositions described herein may include low amounts of heat; for example, lamps used to provide the UV light for curing may also generate some heat. In addition, heat may be generated from other sources (including the ambient temperature of a facility); however, the methods and compositions described herein require minimal, if any, additional heat in order to achieve appropriate curing. In addition, the lack of solvent in the present compositions and methods removes the requirement for using heat to drive off solvent, a process which adds significant time and cost to the coating procedure. Thus, the use of UV light for curing, and the removal of solvent from the composition, dramatically decreases the time for completion of the total coating process for each article coated, which allows for processing of more parts in the same time needed for solvent-based methods, and fulfilling batch orders requires less time.

The ability to minimize the usage of space for production, whether it is floor space, wall space, or even ceiling space (in the situation when objects are hung from the ceiling), can be critical in terms of productivity, production costs and initial capital expenditure. The removal of the solvent from the UV-curable compositions described herein allows for the removal of large ovens from the production line. These ovens are used to cure and force the rapid evaporation of the solvent when using solvent-based coating compositions. Removing the ovens significantly decreases the volume (floor, wall, and ceiling space) required for the production system, and in effect utilizes less space for existing production lines. Furthermore, the expense associated with operating the ovens is no longer an issue and the result is decreased production costs. For new production lines, removal of these ovens from the design actually saves space, and hence a smaller building may be used to house the production line, thereby decreasing the construction costs. In addition, the capital expenditure for the new production line will be less because ovens are no longer required. The smaller volume occupied by production lines of the methods and compositions described herein increase productivity by allowing for increased numbers of production lines in comparison to solvent based processes, and allowing for integration into established production lines.

As noted above, coating compositions which are solvent-based, whether organic solvent or aqueous based, require the use of heat to dry the coated surfaces and thereby force the evaporation of the solvent. Large ovens are used to accomplish this process, and it can be appreciated that there is a large cost associated with operating these ovens. Furthermore, the use of ventilation systems (for instance large fans), and air pollution control systems all require energy to operate. Therefore, the UV-curable coatings, compositions and methods described herein create significant energy and cost savings by limiting (or eliminating) the need for large ovens, associated ventilation systems and air purification systems required for alternative thermal or solvent-based coating compositions and methods.

Gloss essentially refers to the smoothness and shine of a surface, and both of these properties are important when considering the visual appearance and ultimate visual acceptability of a coating. As discussed above, the incorporation of polymerizable pigment dispersions into the coating composition can yield greater tinctorial strength and enhanced gloss. Furthermore, the incorporation of fillers in the coating composition, along with controlled polymerization conditions, can impart enhanced smoothness. The control of the polymerization process will be described in detail later, briefly however, it involves the use of mixtures of photoinitiators which possess different absorbance characteristics such that longer wavelength radiation can be used to excite a photoinitiator or photoinitiators of the mixture, while shorter wavelength radiation is used to excite the other photoinitiators of the mixture. In this manner, the order of excitation can be important. It is desirable that the longer wavelength photoinitiators are excited first, as this allows for improved adhesion and traps the filler components in place. The shorter wavelengths photoinitiators are then excited to complete the polymerization process. If this order of excitation is not used (or a variant thereof, such as alternating exposures, flashing or other sequences) the filler compounds can aggregate and create a matted finish. Thus, the long wavelength-short wavelength procedure can improve visual appearance and acceptability by enhancing the surface smoothness, enhancing the surface shine, or enhancing the surface smoothness and surface shine. However, if a matted appearance is desired, then a short wavelength-long wavelength procedure may be used.

There is considerable benefit to having a coating composition and process which requires only a single coating step. This is cost effective in terms of the quantity of coating composition used, as well as with the overall production time per item coated. The coating composition must still impart beneficial qualities, such as corrosion resistance and abrasion resistance when applied as a single coat. The UV-curable coating compositions described herein utilize fillers in the mixture of oligomers, monomers, polymerizable pigment dispersion, and photoinitiators to impart desirable rheological characteristics to the resulting film that is applied to the surface prior to exposure to UV radiation. These rheological properties include viscosity and thixotropic behavior, which allows the composition to be sprayed onto a surface, allows the composition to remain where it lands on the surface, and allows the composition droplets to flow together and fill in any gaps without dripping or running off the surface, thereby creating a complete, near pinhole-free film on the surface. Such control of the rheological properties of the UV-curable coating composition described herein gives coatings with improved coverage obtained in a single application step, and thereby, in the case of pigmented compositions described herein, improves the coating hiding power.

The 100% solids, UV-curable coating compositions described herein can be applied to surfaces by spraying, curtain coating, dipping, rolling or brushing. However, spraying is the one of the most efficient methods of application, and this can be accomplished using High Volume Low Pressure (HVLP) methodology or electrostatic spraying technology. HVLP and electrostatic spraying techniques are methods well established in the coating industry, thus it is adventitious to develop coating compositions which utilize these application means. In addition, the UV-curable compositions described herein may be applied using air-assisted/airless type spraying technology. Air-assisted airless pumps are usually air-operated, positive displacement, reciprocating piston pumps that siphon coating compositions directly out of a container. An air compressor operates both the pump and the gun at about one-quarter the amount of air needed for a conversion HVLP gun, with the fluid is delivered at a significantly higher fluid pressure. The coating composition atomizes as it escapes to atmospheric pressure, and the gun then adds a little bit of air to the ends of the spray pattern, eliminating the "tails" or heavy edges, thereby minimizing overlapping lines or stripes. Thus, the "air assist" of the "airless" process.

The cleaning regimens used to clean surfaces prior to coating with solvent-based coating compositions generally involves contacting the surface with an alkaline-based cleaner or an acidic cleaner, typically as aqueous solutions. Examples of alkaline cleaning agents include sodium hydroxide and potassium hydroxide. In addition to the cleaning agent and water, the cleaning solution may optionally include surfactants and builders, such as soda ash, pyrophosphate, or tripolyphosphate. Thus, harsh conditions are needed to clean surfaces prior to coating with solvent-based compositions. In contrast, as discussed above, the methods and compositions described herein require limited and simple (if any) cleaning prior to coating an object. In one embodiment, cleaning an article prior to coating with the 100% solids, UV-curable coating compositions described herein simply requires washing with a biodegradable organic cleaner and water to remove loose impurities, surface soils, oil and grease, a water rinse, and drying. The water rinse can use deionized, purified water or tap water, with a contact time and/or water flow rate sufficient to remove substantially all of the cleaner from the surface. The waste stream from this simplified cleaning process contains less toxic and/or harmful materials than the process used for solvent-based coating compositions. Thus, this cleaning process is more environmentally friendly than the process used for solvent-based coating compositions.

The characteristics of the UV curable, 100% solids compositions described herein include, but are not limited to, zero VOC's, zero HAP's, cure in seconds, for example, but not limited to, 1.5 seconds, (thereby decreasing cure time by 99%), require up to 80% less floor space, require up to 80% less energy, are non-flammable, require no thinning, are extremely durable, are high gloss, applied using HVLP or electrostatic bell, do not require flash off ovens, do not require thermal cure, have no thermal stress and no orange peel effect. Further, they enable the user to decrease production time while producing a product with superior, more reproducible appearance. The user stands to save time, energy, and space. In addition, the user may reduce or eliminate emissions as no solvent or vehicles are used.

Processes and assemblages for applying sprayable, ultraviolet light curable, 100% solids compositions described herein are disclosed. Characteristics of the processes include, but are not limited to, providing an industrial strength coating, having up to 98% reclamation of overspray, no cooling line required, immediate "pack and ship," decreased parts in process, less workholders, no workholder burn off, eliminate air pollution control systems, safer for the environment, safer for employees, decreased production costs, decreased production time, and increased production.

Compositions

The mechanical properties of UV-coatings, such as elasticity, flexibility and hardness depend upon the type of oligomers and monomers incorporated into the coating composition. By way of example only, polyester acrylates combine good abrasion resistance with toughness, whereas urethane acrylates and polyether acrylates can provide flexibility, elasticity and hardness. Thus, the composition described herein combine oligomers and monomers which impart various properties to cured coatings to obtain UV-curable coatings with good adhesion, high flexibility, and abrasion and scratch resistance.

The compositions described herein are essentially solvent free, and are therefore referred to as a solids composition. Thus, there is disclosed a composition of matter comprising UV-curable materials (oligomers and monomers), photoinitiators, solid pigment dispersions, adhesion promoters, corrosion inhibitors, fillers and nano-fillers to obtain flexible, abrasion and scratch resistant coatings, which also exhibits enhanced adhesion properties. The compositions described herein consists of, based on total composition weight; 15–45% oligomers or multiplicity of oligomers, 25–65% of monomer or multiplicity of monomers, 2–10% photoinitiator or multiplicity of photoinitiators, 0–15% solid pigment or multiplicity of solid pigment dispersions, 0.01–2% corrosion inhibitor, 0.01–2% filler, and 0.1%–25% nano-filler mixture; wherein the composition is sprayable by HVLP, electrostatic bell, or air-assisted/airless without the addition of heat, and is curable by ultraviolet radiation.

The oligomers may be selected from the group consisting of monoacrylates, diacrylates, triacrylates, polyacrylates, urethane acrylates, polyester acrylates, polyether acrylates, epoxy acrylates and mixtures thereof. Suitable compounds which may be used include, but are not limited to, trimethylolpropane triacrylate, alkoxylated trimethylolpropane triacrylate, such as ethoxylated or propoxylated trimethyolpropane triacrylate, 1,6-hexane diol diacrylate, isobornyl acrylate, aliphatic urethane acrylates (di-, tri-, hex-: Ebecryl 230, Ebecryl 244, Ebecryl 264, Ebecryl 220), vinyl acrylates, epoxy acrylates, ethoxylated bisphenol A diacrylates, trifunctional acrylic ester, unsaturated cyclic diones, polyester diacrylates; epoxy diacrylate/monomer blends, aliphatic urethane triacrylate/monomer blends, aliphatic urethane triacrylates blended with 1,6-hexanediol acrylate, hexafunctional urethane acrylates, siliconized urethane acrylates, aliphatic siliconized urethane acrylates, CN990 (Sartomer, Exton, Pa., U.S.A.), bisphenol epoxy acrylates blended with trimethylolpropane triacrylate, fatty acid modified bisphenol A acrylates, acrylated epoxy polyol blended with trimethylolpropane triacrylate, and mixtures thereof.

The monomers are chosen from a group consisting of 2-phenoxyethyl acrylate, isobornyl acrylate, acrylate ester derivatives, methacrylate ester derivatives; trimethylolpropane triacrylate, 2-phenoxyethyl acrylate esters, and cross-linking agents, such as, but not limited to, propoxylated glyceryl triacrylate, tripropylene glycol diacrylate, and mixtures thereof.

The rapid polymerization reaction is initiated by a photoinitiator component of the composition when exposed to ultraviolet light. The photoinitiators used in the compositions described herein are categorized as free radicals; however, other photoinitiator types can be used. Furthermore, combinations of photoinitiators may be used which encompass different spectral properties of the UV sources used to initiate polymerization. In one embodiment, the photoinitiators are matched to the spectral properties of the UV sources. It is to be appreciated that the compositions described herein may be cured by medium pressure mercury arc lights which produce intense UV-C (200–280 nm) radiation, or by doped mercury discharge lamps which produce UV-A (315–400 nm) radiation, or UV-B (280–315 nm) radiation depending on the dopant, or by combination of lamp types depending on the photoinitiator combinations used. In addition, the presence of pigments can absorb radiation both in the UV and visible light regions, thereby reducing the effectiveness of some types of photoinitator. However, phosphine oxide type photoinitiators, for example but not limited to bis acylphosphine oxide, are effective in pigmented, including, by way of example only, black, UV-curable coating materials. Phosphine oxides also find use as photoinitiators for white coatings.

The photoinitiators and co-photoinitiators may be selected from a group consisting of phosphine oxide type photoinitiators, diphenyl (2,4,6-trimethylbenzoyl) phosphine oxide, benzophenone, 1-hydroxycyclohexyl phenyl ketone, 2-hydroxy-2 -methyl-1-phenyl-propan-1-one (DAROCUR® 1173 from Ciba Specialty Chemicals 540 White Plains Road, Tarrytown, N.Y., U.S.A.)), 2,4,6-trimethylbenzophenone and 4-methylbenzophenone, ESACURE® KTO-46 (Lamberti S.p.A., Gallarate (VA), Italy), oligo(2-hydroxy-2-methyl-1-(4-(1-methylvinyl)phenyl)propanone), amine acrylates, thioxanthones, benzyl methyl ketal, and mixtures thereof. In addition, the photoinitiators and co-photoinitiators may be selected from 2-hydroxy-2-methyl-1-phenyl-propan-1-one (DAROCUR® 1173 from Ciba Specialty Chemicals 540 White Plains Road, Tarrytown, N.Y., U.S.A.), phosphine oxide type photoinitiators, IRGACURE® 500 (Ciba Specialty Chemicals 540 White Plains Road, Tarrytown, N.Y., U.S.A.), amine acrylates, thioxanthones, benzyl methyl ketal, and mixtures thereof. In addition, thioxanthone is used as a curing booster. The liquid photoinitiator is chosen from a group consisting of benzonephenones, 1-hydroxycyclohexyl phenyl ketone, phosphine oxides, and mixtures thereof. The solid photoinitiator is a phosphine oxide.

Other photoinitiators which are suitable for use in the practice described herein include, but are not limited to, 1-phenyl-2-hydroxy-2-methyl-1-propanone, oligo {2-hydroxy-2 methyl-1-4-(methylvinyl)phenylpropanone)}, 2-hydroxy 2-methyl-1-phenyl propan-1 one, bis (2,6-dimethoxybenzoyl)-2,4,4-trimethylpentyl phosphine oxide, 1-hydroxycyclohexyl phenyl ketone and benzophenone as well as mixtures thereof. Still other useful photoinitiators include, for example, bis(n,5,2,4-cyclopentadien-1-yl)-bis 2,6-difluoro-3-(1H-pyrol-1-yl) phenyl titanium and 2-benzyl-2-N,N-dimethyl amino-1-(4-morpholinophenyl)-1-butanone. These compounds are IRGACURE® 784 and IRGACURE® 369, respectively (both from Ciba Specialty Chemicals 540 White Plains Road, Tarrytown, N.Y., U.S.A.) While, still other useful photoiniators include, for example, 2-methyl-1-4(methylthio)-2-morpholinopropan-1-one, 4-(2-hydroxy) phenyl-2-hydroxy-2-(methylpropyl)ketone, 1-hydroxy cyclohexyl phenyl ketone benzophenone, (cyclopentadienyl)(1-methylethyl)benzene-iron hexafluorophosphate, 2,2-dimethoxy-2-phenyl-1-acetophen-one 2,4,6-trimethyl benzoyl-diphenyl phosphine oxide, benzoic acid, 4-(dimethyl amino)-ethyl ether, as well as mixtures thereof.

Corrosion inhibitors are formulated into coatings to minimize corrosion of the substrate to which it is applied. Suitable corrosion inhibitors can be selected from organic pigments, inorganic pigments, organometallic pigments or other organic compounds which are insoluble in the aqueous phase. It is also possible to use concomitantly anti-corrosion pigments, for example pigments containing phosphates or borates, metal pigments and metal oxide pigments, for example but not limited to zinc phosphates, zinc borates, silicic acid or silicates, for example calcium or strontium silicates, and also organic pigments corrosion inhibitor based on aminoanthraquinone. In addition inorganic corrosion inhibitors, for example salts of nitroisophthalic acid, tannin, phosphoric esters, substituted benzotriazoles or substituted phenols, can be used. Furthermore, sparingly water-soluble titanium or zirconium complexes of carboxylic acids and resin bound ketocarboxylic acids are particularly suitable as corrosion inhibitors in coating compositions for protecting metallic surfaces. In addition, an embodiment is an all-solids, non-metal corrosion inhibitor, including by way of example only, Cortec Corporation's (4119 White Bear Parkway, St. Paul, Minn., U.S.A.), M-235 product, and any other upgrades and superseding products.

Pigments, are insoluble white, black, or colored material, typically suspended in a vehicle for use in a paint or ink, and may also include effect pigments such as micas, metallic pigments such as aluminum, and opalescent pigments. Pigments are used in coatings to provide decorative and/or protective functions however, due to their insolubility, pigments may be a possible contributing factor to a variety of problems in liquid coatings and/or dry paint films. Examples of some film defects thought to be attributable to pigments include: undesirable gloss due to aggregates, blooming, pigment fading, pigment flocculation and/or settlement, separation of pigment mixtures, brittleness, moisture susceptibility, fungal growth susceptibility, and/or thermal instability.

An "ideal" dispersion consists of a homogeneous suspension of primary particles. However, inorganic pigments are often incompatible with the resin in which they are incorporated, and this generally results in the failure of the pigment to uniformly disperse. Furthermore, a milling step may be required as dry pigments comprise a mixture of primary particles, aggregates, and agglomerates which must be wetted and de-aggregated before the production of a stable, pigment dispersion is obtained. The level of dispersion in a particular pigment-containing coating composition affects the application properties of the composition as well as the optical properties of the cured film. Improvements in dispersion result in improvements in gloss, color strength, brightness, and gloss retention.

Treatment of the pigment surface to incorporate reactive functionality improves pigment dispersion. Examples of surface modifiers include, but are not limited to, polymers such as polystyrene, polypropylene, polyesters, styrene-methacrylic acid type copolymers, styrene-acrylic acid type copolymers, polytetrafluoroethylene, polychlorotrifluoroethylene, polyethylenetetrafluoroethylene type copolymers, polyaspartic acid, polyglutamic acid, and polyglutamic acid-γ-methyl esters, and modifiers such as silane coupling agents and alcohols.

These surface-modified pigments improve the pigment dispersion in a variety of resins, for example, olefins such as, by way of example only, polyethylene, polypropylene, polybutadiene, and the like; vinyls such as polyvinylchloride, polyvinylesters, polystyrene; acrylic homopolymers and copolymers; phenolics; amino resins; alkyds, epoxys, siloxanes, nylons, polyurethanes, phenoxys, polycarbonates, polysulfones, polyesters (optionally chlorinated), polyethers, acetals, polyimides, and polyoxyethylenes.

Various organic pigments can be used in the compositions described herein, including, but not limited to, carbon black, azo-pigment, phthalocyanine pigment, thioindigo pigment, anthraquinone pigment, flavanthrone pigment, indanthrene pigment, anthrapyridine pigment, pyranthrone pigment, perylene pigment, perynone pigment and quinacridone pigment.

Various inorganic pigments can be used in the compositions described herein, for example, but not limited to, titanium dioxide, aluminum oxide, zinc oxide, zirconium oxide, iron oxides: red oxide, yellow oxide and black oxide, Ultramarine blue, Prussian blue, chromium oxide and chromium hydroxide, barium sulfate, tin oxide, calcium, titanium dioxide (rutile and anatase titanium), sulfate, talc, mica, silicas, dolomite, zinc sulfide, antimony oxide, zirconium dioxide, silicon dioxide, cadmium sulfide, cadmium selenide, lead chromate, zinc chromate, nickel titanate, clays such as kaolin clay, muscovite and sericite.

The solid pigment dispersions used in the compositions described herein may also be selected from a group consisting of the following pigments bonded with modified acrylic resins: carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red. These polymerizable pigment dispersions are distinguishable from other pigment dispersions which disperse insoluble pigment particles in some type of resin and entrap the pigment particles within a polymerized matrix. The pigment dispersions used in the compositions and methods described herein have pigments treated such that they are attached to acrylic resins; consequently the pigment dispersion is polymerizable upon exposure to UV irradiation and becomes intricately involved in the overall coating properties.

The average particle size of fillers in the compositions described herein includes by way of example less than about 20 μm, and by way of further example, with an average particle size 1 to 10 μm discrete particles; whereas, the average particle size of nano-filler particles includes by way of example less than about 200 μm, and by way of further example, with an average particle size 5 to 50 nm discrete particles to nanometer-sized particles. The addition of fillers imparts certain theological properties to the composition, such as viscosity; however, the addition of nanoscale fillers imparts dramatically different effects on the coating mechanical properties in comparison to micron scale fillers. Thus, the mechanical properties of coatings can be manipulated by varying the content of micron sized fillers and nano-fillers in the coating composition.

Polymer nanocomposites are the blend of nanometer-sized fillers with either a thermoset or UV-curable polymers, and such polymer nanocomposites have improved properties compared to conventional filler materials. These improved properties include improved tensile strength, modulus, heat distortion temperature, barrier properties, UV resistance, abrasion and scratch resistance, and conductivity. The incorporation of certain nano-fillers, such as nano-alumina and nano-silicon, can provide long-term abrasion resistant coatings without significantly effecting optical clarity, gloss, color or physical properties. These improved properties may be in large part due to the small size and large surface area of the nanoscale fillers.

Fillers and nano-fillers can be either insoluble inorganic particles, or insoluble organic particles. The inorganic fillers and nano-fillers are generally metal oxides, although other inorganic compounds can be used. Examples of inorganic fillers and nano-fillers include aluminum nitrides, aluminum oxides, antimony oxides, barium sulfates, bismuth oxides, cadmium selenides, cadmium sulfides, calcium sulfates, cerium oxides, chromium oxides, copper oxides, indium tin oxides, iron oxides, lead chromates, nickel titanates, niobium oxides, rare earth oxides, silicas, silicon dioxides, silver oxides, tin oxides, titanium dioxides, zinc chromates, zinc oxides, zinc sulfides, zirconium dioxides, and zirconium oxides. Alternatively, organic fillers and nano-fillers are generally polymeric materials ground into appropriate sized particulates. Examples of nanometer sized organic nano-fillers include, but are not limited to, nano-polytetrafluoroethylene, acrylate nanosphere colloids, methacrylate nanosphere colloids, and combinations thereof, although micron sized fillers of the polytetrafluoroethylene, acrylate, methacrylate, and combinations thereof may be used.

Nano-alumina is composed of high purity aluminum oxide that is of nanometer size, including by way of example less than 200 nm, and within the range of approximately 5–40 nanometer discrete spherical particles. The incorporation of nano-alumina into coating systems maintains excellent optical clarity, gloss and physical properties of the coatings, such that nano-alumina-based compositions find use in abrasion resistant coating applications requiring superior optical transparency such as eye glasses; fine polishing applications, including semiconductors; and nanocomposite applications, including improved thermal management. In addition, incorporation of nano-alumina into coating compositions can results in extremely hard coatings, which may replace "hard chrome", and find use in coating objects which may need impact resistance.

"Hard chrome" is generally obtained from the process of electrodepositing a thick layer (0.2 mils to 30 mils or more) of chromium, usually applied directly to ferrous substrates, like steel, although it can also be applied to non-ferrous substrates. The thick chrome is almost always deposited from a hexavalent chromium plating bath. "Hard chrome" can be used for the hard tipping of cutting tools and to build up shafts or areas on steel that are subject to severe wear. The chromium deposit is usually selected to take advantage of its desirable properties, such as hardness, wearability, corrosion resistance, lubricity, and low coefficient of friction. A variety of parts which can be hard chrome plated include, hydraulic rods and cylinders, aircraft jet engine components, diesel cylinder liners, pneumatic struts for automobile hatchbacks, shock absorbers, aircraft landing gear, railroad wheel bearings and couplers, tool and die parts, and molds for the plastic and rubber industry.

Chromium can exist in two valence states, trivalent chromium (Cr III) and hexavalent chromium (Cr VI). Chromium III is an essential element in humans and is much less toxic than chromium (VI). The respiratory tract is the major target organ for chromium (VI) toxicity, for acute (short-term) and chronic (long-term) inhalation exposures. Shortness of breath, coughing, and wheezing can occur from acute exposure to chromium (VI), while perforations and ulcerations of the septum, bronchitis, decreased pulmonary function, pneumonia, and other respiratory effects have been noted from chronic exposure. Human studies have clearly established that inhaled chromium (VI) is a human carcinogen, resulting in an increased risk of lung cancer. It is clear that hexavalent chromium plating baths have significant health risks and environmental toxicity issues associated with their use to obtain hard coatings. In addition, the use of the hard chrome plating process can take several hours to build up, and is therefore very time consuming. Thus, there is a need for the development of coatings which are easy and rapid to apply, are not a health risk, and are also not hazardous to the environment. Coating compositions which incorporate nano-alumina are environmentally friendly, can be applied easily and quickly, and result in hard, highly abrasion resistant and scratch resistant coatings. Furthermore, the incorporation of nano-alumina into coating systems also maintains excellent optical clarity, gloss and physical properties of the coatings.

Nano-silicon dioxides having a nanometer size, including by way of example less than about 200 nm, and by way of further example, with an average particle size 5 to 40 nm, can be incorporated into coating compositions with up to 40~65% silica content with little increase in composition viscosity and no loss in coating clarity. In addition, the resulting coating also has improved toughness, hardness and abrasion and scratch resistance, with no reduction in coating transparency and gloss. Other properties and features obtained when incorporating nano-silicon into coating compositions are, it acts as a barrier effect against gases, water vapor and solvents, it has increased weathering resistance and inhibited thermal aging, it exhibits reduced cure shrinkage and heat of reaction, reduced thermal expansion and internal stresses, increased tear resistance, fracture toughness and modulus, has improved adhesion to a large number of inorganic substrates (e.g. glass, aluminium), has improved dirt resistance against inorganic impurities (e.g. soot) by a more hydrophilic surface, and has improvements to other desired properties such as: thermal stability, stain-resistance, heat conductivity, dielectric properties.

Other materials having properties such as wear resistance, hardness, stiffness, abrasion resistance, chemical resistance, and corrosion resistance which may be used as nano-fillers include: oxides, carbides, nitrides, borides, silicates, ferrites and titanates. For instance, examples of such nano-fillers are, but not limited to, nano-zirconium oxide, nano-zirconium dioxides, nano-silicon carbide, nano-silicon nitride, nano-sialon (silicon aluminum oxynitride), nano-aluminum nitrides, nano-bismuth oxides, nano-cerium oxides, nano-copper oxides, nano-iron oxides, nano-nickel titanates, nano-niobium oxides, nano-rare earth oxides, nano-silver oxides, nano-tin oxides, and nano-titanium oxides. In addition to these properties, these materials have relatively high mechanical strength at high temperatures.

Alternatively, the micron sized fillers used in the composition described herein are selected from a group consisting of amorphous silicon dioxide prepared with polyethylene wax, synthetic amorphous silica with organic surface treatment, untreated amorphous silicon dioxide, alkyl quaternary bentonite, colloidal silica, acrylated colloidal silica, alumina, zirconia, zinc oxide, niobia, titania aluminum nitride, silver oxide, cerium oxides, and combinations thereof. The silicon dioxides are chosen from a group consisting of both synthetic and natural silicon dioxides with surface treatments including polyethylene wax or waxes and IRGANOX® from Ciba Specialty Chemicals 540 White Plains Road, Tarrytown, N.Y., U.S.A.

Coating flexibility is an important characteristic for coatings of objects which flex, distort, or otherwise change shape, such as, but not limited to, various springs and the undercarriage of motor vehicles. Coating flexibility allows the coating to flex or distort without cracking when the object flexes, distorts or changes shape; whereas coating adhesion properties allows the coating to remain attached to the object when the object flexes, distorts or changes shape. The compositions described herein may be used to obtain flexible, abrasion, scratch and/or corrosion resistant coatings with enhanced adhesion characteristics. The compositions described herein thereby substitute for, or replace, flexible coatings on objects or articles of manufacture in which at least one function of the object or article of manufacture would be enhanced or improved by the presence of a flexible coating. Examples of such objects or articles of manufacture which can be coated using the compositions described herein include, but are not limited to, springs and the undercarriage of motor vehicles. Examples of such springs which can be coated using the compositions described herein include, but are not limited to, leaf springs, shock absorber springs, watch springs, and bicycle seat springs.

Possible methods of applying the composition described herein include spraying, brushing, curtain coating, dipping, and rolling. To enable spraying onto a desired surface the pre-polymerization viscosity must be controlled. This is achieved by the use of low molecular weight monomers which take the place of organic solvents. However, these monomers also participate and contribute to final coating properties and do not evaporate. The viscosity of the composition described herein is from about 2 centipoise to about 1500 centipoise; wherein a viscosity of approximately 500 centipoise or less at room temperature allows for coverage in one coat with application by HVLP, air-assisted/airless, or electrostatic bell without the addition of heat.

100% Solids, UV-curable Coating Composition Use

The compositions described herein are a significant improvement as they do not contain any water or organic solvent which must be removed before complete curing is achieved. Therefore, the compositions described herein are much less hazardous to the environment, and are economical because they requires less space, less energy and less time. In addition, the compositions described herein can be applied in as a single coat, and give flexible, abrasion resistant, scratch resistant and corrosion resistant coatings with enhanced adhesion properties. Therefore, use of the compositions and methods described herein to coat objects which flex, distort, or otherwise change shape, decreases coating time and therefore increases production.

FIG. 1 is a flowchart of the process used to coat flexible objects and/or objects comprising angular features. Initially the object is either optionally cleaned prior to coating, or is directly coated with the coating compositions described herein. The coated object is then optionally packed and shipped for consumer use, industrial use, scientific use, or any other use contemplated by the end user.

Figure 2:
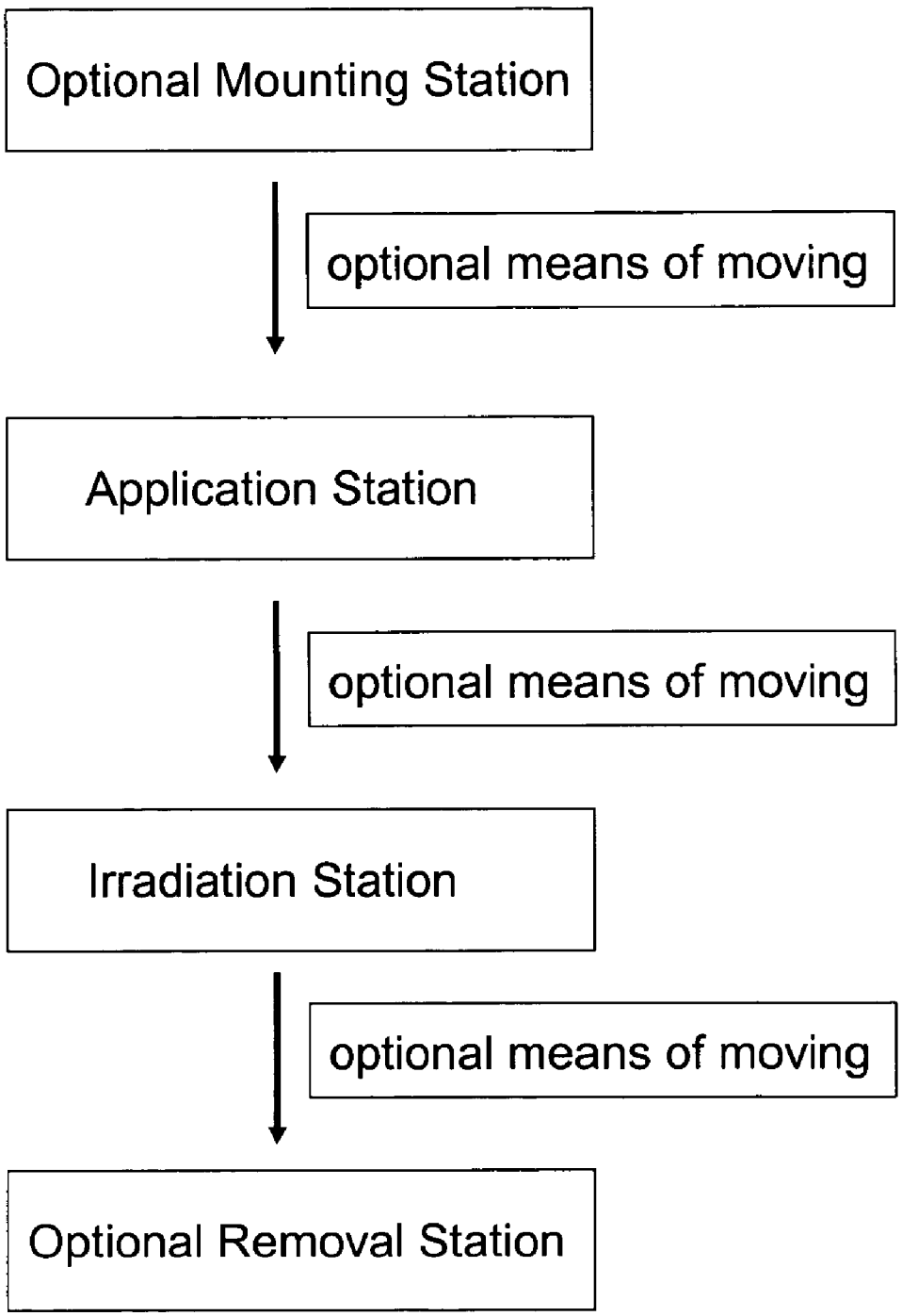
FIG. 2 is flowchart of one possible assemblage for coating flexible and/or angular objects with the coating compositions described herein.

FIG. 2 is a schematic of the assemblage of processes used for coating objects with the UV-curable coating compositions described herein. The first stage of the assemblage is an optional mounting station, in which the object to be coated is attached to a movable unit, by way of example only, a spindle, a hook, or a baseplate. The object can be attached using, by way of example only, nails, screws, bolts and nuts, tape, glue, or any combination thereof. In addition, human workers can perform the task of attachment, or alternatively, robots can be used to do the same function. Next, the mounted object is translated by an optional means for moving to an Application Station. The optional means for moving can be achieved, by way of example only, conveyer belts, rails, tracks, chains, containers, bins, carts, and combinations thereof. In addition, the means for moving can be mounted on a wall, or a floor, or a ceiling, or any combination thereof. The Application Station is the location at which the desired object is coated with the necessary coating composition. The means for applying the coating composition is located at the Application Station. The means for applying the coating composition includes, by way of example only, High Volume Low Pressure (HVLP) equipment, electrostatic spraying equipment, air-assisted/airless spraying equipment, brushing, rolling, dipping, blade coating, curtain coating or a combination thereof. The multiple means for applying the coating composition can be incorporated and arranged at the Application Station whereby it is ensured that top, bottom and side coverage of the object occurs. In addition, the mounted object is optionally rotated, on at least one axis, prior to and during the application of the coating composition to ensure uniform coverage. In addition, if desired masks or templates may be included in order to incorporate a design, logo, or the like onto the object. The Application Station may include multiple types of coatings, including different coating colors, as may be desired. When application of the coating composition is complete, the mounted coated object may continue to rotate, or may cease rotating. The Application Station may also include an optional reclamation system to reclaim any oversprayed coating composition, and whereby reclaim at least 98% of oversprayed coating composition. This composition recycling system allows for significant savings in the use and production of coating compositions, as the reclaimed composition can be applied to different objects in the process line.

The mounted coated object may now be translated from the Application Station, by the optional means for moving, to the Irradiation Station (also referred to herein as a curing chamber), wherein curing of the coated object occurs. The Irradiation Station is located further along the production line at a separate location from the Application Station. In one embodiment the Irradiation Station has a means for limiting exposure of actinic radiation to other portions of the assemblage. Multiple means are envisioned, including, but not limited to, doors, curtains, shields, and tunnels which incorporate angular or curved paths along the production line. The means for limiting exposure of actinic radiation of the Irradiation Station are used, such as, by way of example only, either closing doors, placement of shields, or closing curtains, to protect operators from exposure to UV radiation, and to shield the Application Station to ensure that no curing occurs there. Inside the Irradiation Station there are three sets of UV lamps arranged to ensure top, bottom and side exposure to the UV radiation. In addition each UV lamp set contains two separate lamp types; by way of example only, one mercury arc lamp and one mercury arc lamp doped with iron, to ensure proper three dimensional curing. Thus, there are actually six lamps within the Irradiation Station. Alternatively, this three dimensional curing can be achieved by using only two lamps, by way of example only, one mercury arc lamp and one mercury arc lamp doped with iron, with a mirror assembly arranged to ensure exposure to the UV radiation and curing of the top, bottom and sides of the coated object. Regardless of the specific approach used, location of the two lamp types within the Irradiation Station is adventitious as it does not require transport of the coated object to separate locations for partial curing and then complete curing.

In one embodiment, after translation of the mounted coated object inside the Irradiation Station, the doors close and the mounted coated object is again optionally rotated. The longer wavelength lamps, by way of example only, mercury arc lamp doped with iron, are activated for the partial curing stage, and then the shorter wavelength lamps, by way of example only, mercury arc lamp, are activated for the full cure stage. The longer wavelength lamps do not need to be completely off before the shorter wavelength lamps are turned on. Following the two curing stages, all lamps are turned off, the doors on the other side of the Irradiation Station are opened (if doors are installed on the Irradiation Station, otherwise object is otherwise provided an exit from the Irradiation Station) and the fully cured mounted object is translated, using the optional means for moving, to an optional Removal Station. At the optional Removal Station coated, fully cured object may be removed from the mounting and, either moved to a storage facility, using the optional means for moving, or immediately packed and shipped. In addition, human workers can perform the task of removal, or alternatively, robots can be used to do the same function. No cooling is required prior to removal, as no heat is required for the application or curing steps, with all steps occurring at ambient temperature.

Figure 3:
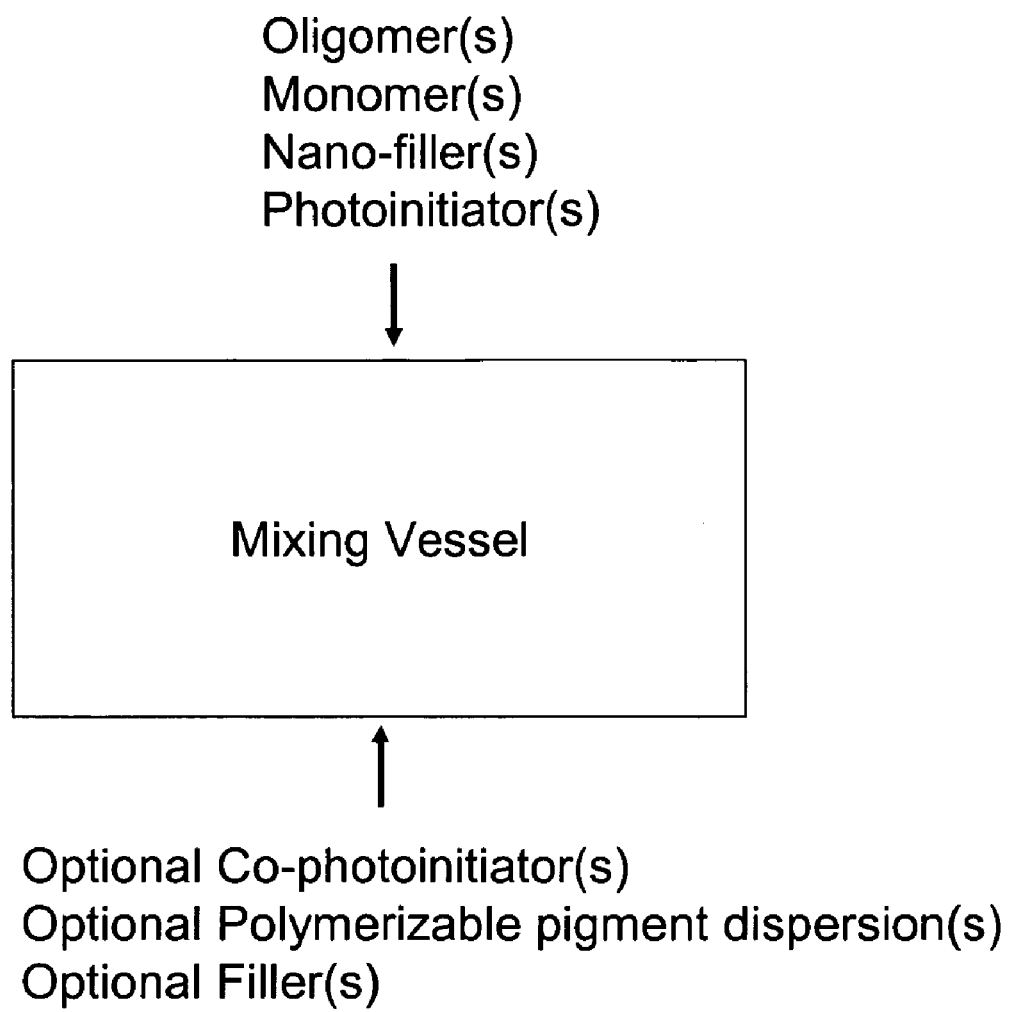
FIG. 3 is an illustration of possible components required to obtain the coating compositions described herein.

FIG. 3 depicts is an illustration of the processes used, and exemplary components of the UV-curable coating compositions described herein. Generally the components are mixed together in a mixing vessel using, by way of example only, a sawtooth blade or a helical mixer. The components of the composition are mixed at sufficient shear until a smooth, homogeneous coating mixture is obtained. In addition, mixing can be achieved by shaking, stirring, rocking, or agitating. The desired compositions are prepared to specification, such as, but not limited to, opacity, color, enhanced adhesion, corrosion resistance, abrasion resistance and gloss. In addition, the coating contains a combination of oligomer and monomers such that necessary specifications are obtained. The polymerizable pigment dispersions and fillers are optional, as shown in FIG. 3, since clear coat compositions are encompassed by the compositions described herein.

Figure 4:
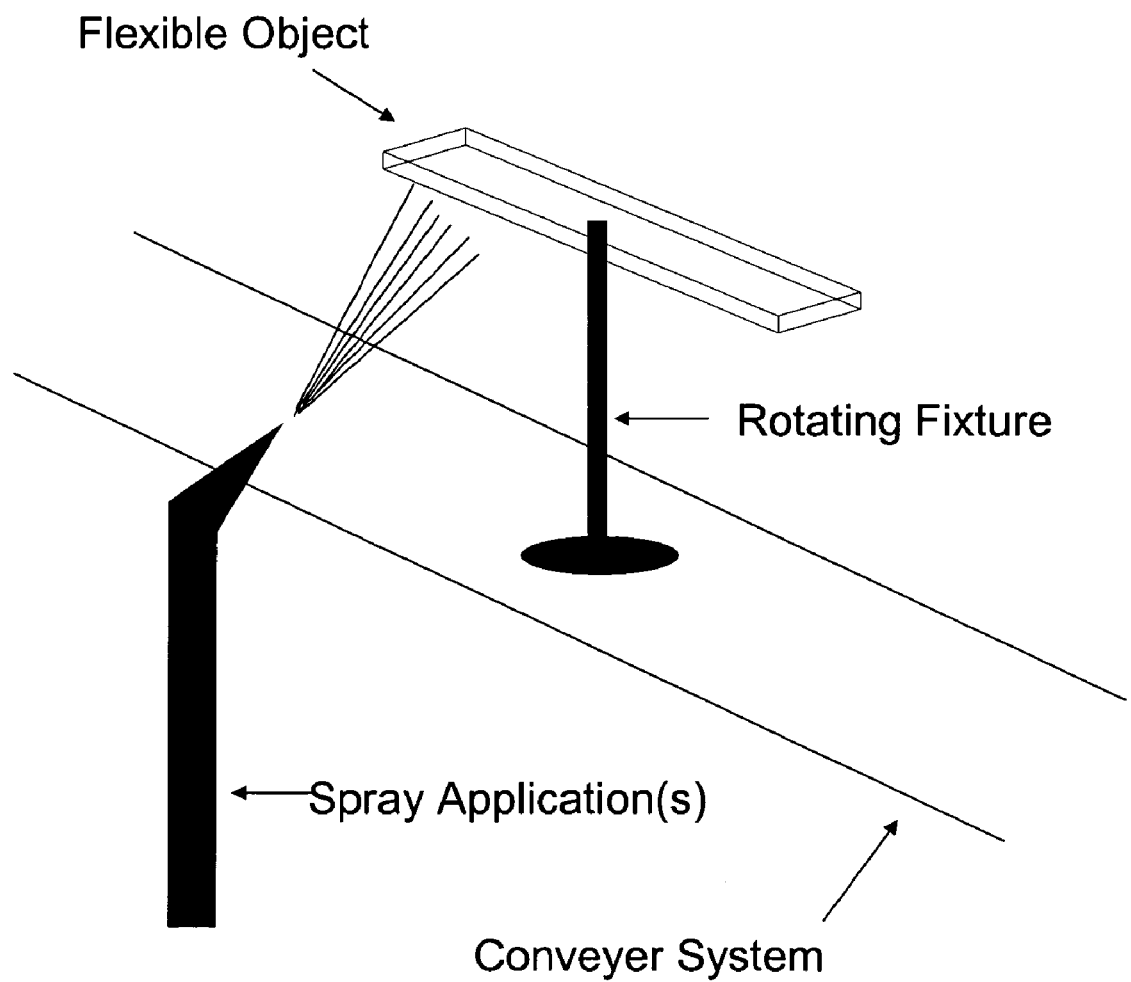
FIG. 4 is an illustration of one method by which the coatings described herein are applied.
Figure 5:
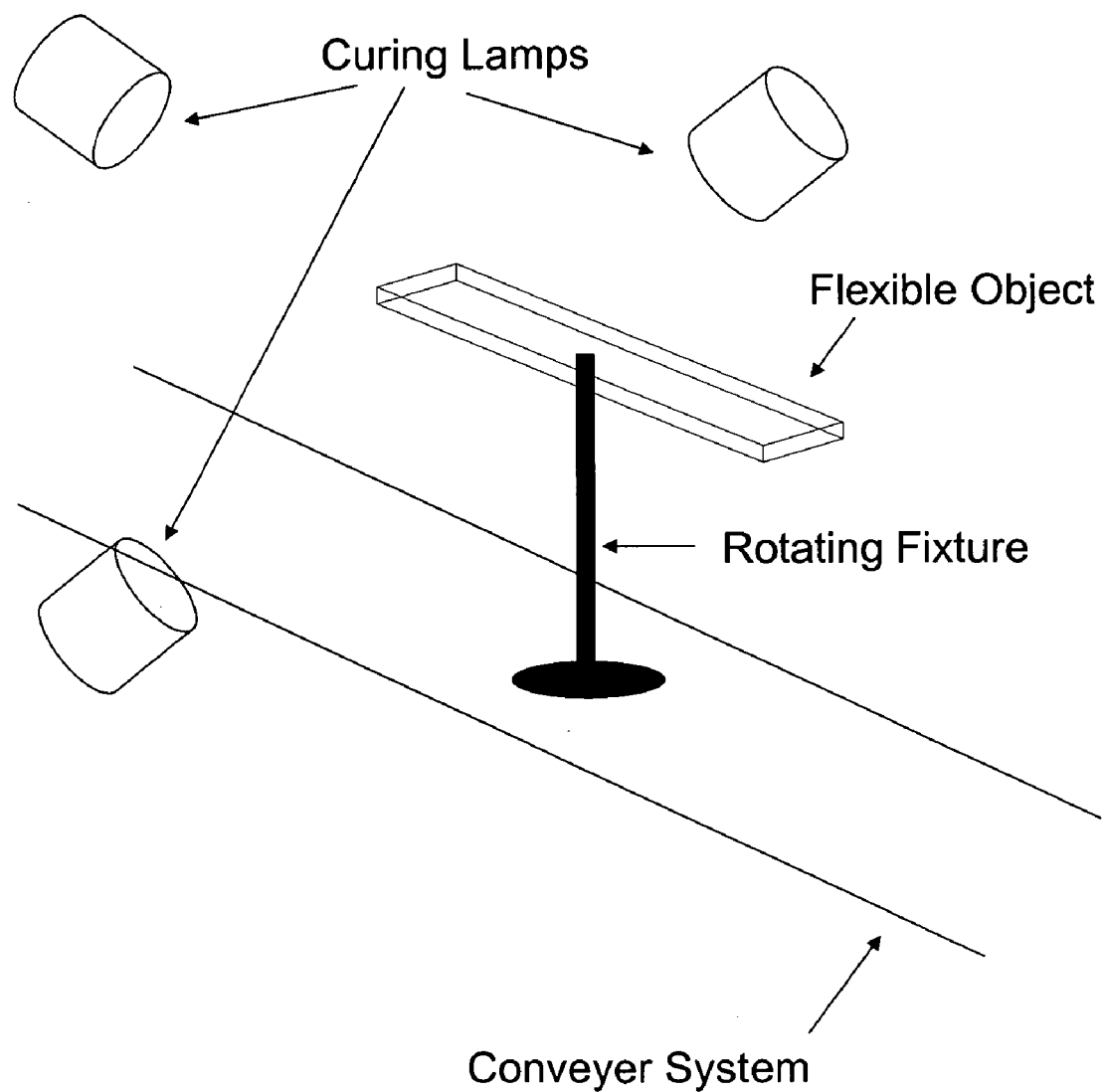
FIG. 5 is an illustration of one method for curing the coating.

Next, as shown in FIG. 4, the compositions are applied to the surface of a flexible object or object comprising angular features, by an application means, including, but not limited to HVLP, air-assisted/airless, or electrostatic bell. FIG. 4 shows the arrangement of spray heads used for coating, although other techniques can be used such as dipping, flow, or curtain coating. As shown in FIG. 4, the object is affixed to a rotating fixture, and this combination is attached to a conveyer system for transport from the coating application area to the curing area. The resulting coating film is then cured, as shown FIG. 5, by using either a single UV light source, or a combination of light sources which emit spectral frequencies that overlap the required wavelengths needed to excite the specific photoinitiators used in the compositions. FIG. 5 indicates the one exemplary UV lamp arrangement for complete three dimensional curing. Finally, after curing is complete, the coated surface is ready for immediate handling and shipping, without the need to wait for parts to cool or for solvent emissions to dissipate.

By the combination of a properly formulated 100% solids UV-curable coating and the appropriate frequencies of light, UV radiation is able to penetrate opaque coatings to reach the base substrate, thereby fully curing the coating. Since this curing process is almost instantaneous, requiring (for example) an average of 1.5 seconds per light (FIG. 6), both time and energy are conserved. Curing lights used may be high pressure mercury lamps, mercury lamps doped with gallium or iron, or in combination as required. Lamps may be powered by direct application of voltage, by microwaves, or by radio-waves.

A coating composition is prepared using a mixture of photoinitiators sufficient to encompass all necessary frequencies of light. These are used to work with the lights or light pairs, arranged to ensure complete cure of an object. Polymerization, in particular acrylate double bond conversion and induction period, can be affected by the choice of oligomers, photoinitiators, inhibitors, and pigments, as well as UV lamp irradiance and spectral output. In comparison to clear coat formulations, the presence of pigments may make curing much more complex due to the absorption of the UV radiation by the pigment. Thus, the use of variable wavelength UV sources, along with matching of absorption characteristics of photoinitiators with UV source spectral output, allows for curing of pigmented formulations.

Light sources used for UV curing include arc lamps, such as carbon arc lamps, xenon arc lamps, mercury vapor lamps, tungsten halide lamps, lasers, the sun, sunlamps, and fluorescent lamps with ultra-violet light emitting phosphors. Medium pressure mercury and high pressure xenon lamps have various emission lines at wavelengths which are absorbed by most commercially available photoinitiators. In addition, mercury arc lamps can be doped with iron or gallium. Alternatively, lasers are monochromatic (single wavelength) and can be used to excite photoinitiators which absorb at wavelengths that are too weak or not available when using arc lamps. For instance, medium pressure mercury arc lamps have intense emission lines at 254 nm, 265 nm, 295 nm, 301 nm, 313 nm, 366 nm, 405/408 nm, 436 nm, 546 nm, and 577/579 nm. Therefore, a photoinitiator with an absorbance maximum at 350 nm may not be a efficiently excited using a medium pressure mercury arc lamp, but could be efficiently initiated using a 355 nm Nd:YVO4 (Vanadate) solid-state lasers. Commercial UV/Visible light sources with varied spectral output in the range of 250–450 nm may be used directly for curing purposes; however wavelength selection can be achieved with the use of optical bandpass or longpass filters. Therefore, as described herein, the user can take advantage of the optimal photoinitiator absorbance characteristics.

Regardless of the light source, the emission spectra of the lamp must overlap the absorbance spectrum of the photoinitiator. Two aspects of the photoinitator absorbance spectrum need to be considered. The wavelength absorbed and the strength of absorption (molar extinction coefficient). By way of example only, the photoinitiators HMPP (2-hydroxy-2-methyl-1-phenyl-propan-1-one) and TPO (diphenyl(2,4,6-trimethylbenzoyl) phosphine oxide) in DAROCUR® 4265 (from Ciba Specialty Chemicals 540 White Plains Road, Tarrytown, N.Y., U.S.A.) have absorbance peaks at 270–290 nm and 360–380 nm, while DAROCUR® 1173 (from Ciba Specialty Chemicals 540 White Plains Road, Tarrytown, N.Y., U.S.A.) have absorbance peaks at 245 nm, 280 nm, and 331 nm, while ESACURE® KTO-46 (from Lamberti S.p.A., Gallarate (VA), Italy) have absorbance peaks between 245 nm and 378 nm, and MMMP in IRGACURE® 907 (from Ciba Specialty Chemicals 540 White Plains Road, Tarrytown, N.Y., U.S.A.) absorbs at 350 nm and IRGACURE® 500 (which is a blend of IRGACURE® 184 (from Ciba Specialty Chemicals 540 White Plains Road, Tarrytown, N.Y., U.S.A.) and benzophenone) absorbs between 300 nm and 450 nm.

The addition of pigment to a formulation increases the opacity of the resulting coating and can affect any through curing abilities. Furthermore, the added pigment can absorb the incident curing radiation and thereby affect the performance of the photoinitiator. Thus, the curing properties of opaque pigmented coatings can depend on the pigment present, individual formulation, irradiation conditions, and substrate reflection. Therefore consideration of the respective UV/Vis absorbance characteristics of the pigment and the photoinitiator can be used to optimize UV curing of pigmented coatings. Generally, photoinitiators used for curing pigmented formulations have a higher molar extinction coefficient between the longer wavelengths (300 nm–450 nm) than those used for curing clear formulations. Although, the presence of pigments can absorb radiation both in the UV and visible light regions, thereby reducing absorption suitable for radiation curing, phosphine oxide type photoinitiators, for example but not limited to bis acylphosphine oxide, are effective in pigmented, including, by way of example only, black, UV-curable coating materials. Phosphine oxides also find use as photoinitiators for white coatings, and enable an effective through cure for the compositions described herein.

The mercury gas discharge lamp is the UV source most widely used for curing, as it is a very efficient lamp with intense lines UV-C (200–280 nm) radiation, however it has spectral emission lines in the UV-A (315–400 nm) and in the UV-B (280–513 nm) regions. The mercury pressure strongly affects the spectral efficiency of this lamp in the UV-A, UV-B and UV-C regions. Furthermore, by adding small amounts (doping) of silver, gallium, indium, lead, antimony, bismuth, manganese, iron, cobalt and/or nickel to the mercury as metal iodides or bromides, the mercury spectrum can be strongly changed mainly in the UV-A, but also in the UV-B and UV-C regions. Doped gallium gives intensive lines at 403 and 417 nm; whereas doping with iron raises the spectral radiant power in the UV-A region of 358–388 nm by a factor of 2, while because of the presence of iodides UV-B and UV-C radiation are decreased by a factor of 3 to 7. As discussed above, the presence of pigments in a coating formulation can absorb incident radiation and thereby affect the excitation of the photoinitiator. Thus, it is desirable to tailor the UV source used with the pigment dispersions and the photoinitiator, photoinitiator mixture or photoinitiator/co-initiator mixture used. For instance, by way of example only, an iron doped mercury arc lamp (emission 358–388 nm) is ideal for use with photoinitiator ESACURE® KTO-46 (from Lamberti S.p.A., Gallarate (VA), Italy) (absorbance between 245 and 378 nm).

Multiple lamps with a different spectral characteristics, or sufficiently different in that there is some spectral overlap, can be used to excite mixtures of photoinitiator or mixtures of photoinitatiors and co-initiators. For instance, by way of example only, the use of a iron doped mercury arc lamp (emission 358–388 nm) in combination with a pure mercury arc lamp (emission 200–280 nm). The order in which the excitation sources are applied can be adventitiously used to obtain enhanced coating characteristic, such as, by way of example only, smoothness, shine, adhesion, abrasion resistance and corrosion resistance. Initial exposure of the coated surface with the longer wavelength source is beneficial, as it traps the filler particle in place and initiates polymerization near the surface, thereby imparting a smooth and adherent coating. Following this with exposure to the higher energy, shorter wavelength radiation enables for a fast cure of the remaining film that has been set in place by the initial polymerization stage.

The time of exposure to each lamp type can be manipulated to enhance the curing of the compositions described herein. One approach used for curing of the compositions described herein used to coat surfaces of flexible objects or objects comprising angular features, is to expose the coated surface to the longer wavelength doped mercury arc lamps for a shorter time than exposure to the shorter wavelength mercury arc lamp. However, this exposure scheme may cause the cured coatings to wrinkle/crinkle. Therefore, other exposure schemes involve identical exposure time for both the short wavelength mercury arc lamp, and the longer wavelength doped mercury arc lamps, or alternatively the exposure time to the longer wavelength doped mercury arc lamp can be longer than the time of exposure for the short wavelength mercury arc lamps.

Testing the Coated Surface

The 100% solids, UV-curable coatings described herein have excellent durability and may be particularly suitable for surfaces which encounter physical wearing or exposure to various weather conditions. The mechanical properties of solid coatings and the various testing methods for them is described in "Mechanical Properties of Solid Coatings" Encyclopedia of Analytical Chemistry, John Wiley & Sons, 2000, which is herein incorporated by reference in its entirety. The coatings, compositions and methods described herein meet and exceed the requirements for at least one of the described tests, in some instances more than one of these tests, and in other instances all these tests. The descriptions for the following tests are provided by way of example only.

For example, the compositions and methods described herein provide an improved cured coating that exhibits improvement in at least one of the following tests: scrub resistance, impact resistance, corrosion resistance, flash rust resistance, higher gloss, exterior durability such as gloss retention, cracking resistance, adhesion to substrates and slip properties.

Scrub resistance testing is an accelerated procedure for determining the resistance of paints to erosion caused by rubbing. Although scrub resistance tests are intended primarily for interior coatings, they are sometimes used with exterior coatings as an additional measure of film performance. In a typical scrub test, the coating is applied to a Scrub Test Panel at a specified film thickness, cured, and then subjected to scrubbing with a straight-line scrub tester. The scrub resistance is the number of scrub cycles required to remove the coating to a specified end point. Alternatively, the loss in weight is determined after a specified number of scrub cycles as a measure of scrub resistance, with calculation of equivalent loss in film thickness.

Impact resistance is a traditional method for evaluating the impact strength or toughness of a coating to a falling object. The test can use a single object (dart) shape at a single drop height, while varying the weight of the dart. The dart size and the drop height are chosen depending upon the expected impact strength of the test sample. A number of test samples are impacted to determine an appropriate starting point for the weight of the dart. The test specimen is clamped securely in a pneumatic ring at the base of the drop tower. The mounting bracket is adjusted to the appropriate drop height, and the dart is inserted into the bracket. The dart is released and dropped onto the center of the test specimen. A series of 20 to 25 impacts are conducted, and if a test specimen passes, the drop weight is increased by one unit. If a test specimen fails, the drop weight is decreased by one unit. Alternatively, panels are tested using progressively increasing drop heights in order to determine the minimum drop height that gives rise to any cracking or peeling from the substrate. The results from these impacts are used to calculate the Impact Failure Weight—the point at which 50% of the test specimens will fail under the impact. Typically the dart is a rounded object with a diameter ranging from 38 mm (1.5 inches) to 51 mm (2 inches) and is dropped from about 0.66 meters (26 inches) 1.5 meters (60 inches).

For coatings to perform satisfactorily, they must adhere to the substrates on which they are applied. A variety of methods can be used to determine how well a coating is adheres to a surface. Commonly used evaluation techniques are performed using a knife or a pull-off adhesion tester. The knife test is a simple test requiring the use of a utility knife to pick at the coating. It establishes whether the adhesion of a coating to a substrate, or to another coating (in multi-coat systems), is at a generally adequate level. Performance is based on both the degree of difficulty to remove the coating from the substrate and the size of removed coating. Alternatively, an "X" is cut into the coating down to the surface, using the knife and cutting guide, by making two cuts at a 30–45 degree angle which intersects to form the "X" shape. At the vertex, the point of the knife is used to attempt to lift up the coating from the substrate or from the coating below.

A more formal version of the knife test is the tape test, which can be conducted with or without humidity. Incorporation of humidity to the tape adhesion/peel back test determines how the adhesive properties of the coating behave under conditions in which corrosion may occur. Pressure sensitive tape is applied and removed over cuts made in the coating. There are two variants of this test; the X-cut tape test and the cross hatch tape test. The X-cut tape test uses a sharp razor blade, scalpel, knife or other cutting device, to make two cuts into the coating down to the substrate with a 30–45 degree angle which intersects to form an "X". A straightedge is used to ensure straight cuts are made. Tape is placed on the center of the intersection of the cuts and then removed rapidly. The X-cut area is then inspected for removal of coating from the substrate or previous coating and rated. Alternatively, the cross hatch tape test is primarily intended for testing coatings less than 5 mils (125 microns) thick. It uses a cross-hatch pattern rather than the X pattern. The cross-hatch pattern is obtained by using a cutting guide or a special cross-hatch cutter with multiple preset blades to make sure the incisions are properly spaced and parallel. Tape is then applied and pulled off; the cut area is then inspected and rated. In one embodiment, a composition described herein yields a coating which is flexible, corrosion resistant, abrasion resistant and scratch resistant coating with 99+% adhesion after 10 days at 110 F. in 100% humidity, and/or a 180 degree bend around a mandrel, such as, by way of example only, a half inch mandrel.

A more quantitative test for adhesion is the pull-off test where a loading fixture, commonly called a dolly or stub, is affixed by an adhesive to a coating. By use of a portable pull-off adhesion tester, a load is increasingly applied to the surface until the dolly is pulled off. The force required to pull the dolly off, or the force the dolly withstood, yields the tensile strength in pounds per square inch (psi) or mega Pascals (MPa). Failure will occur along the weakest plane within the system comprised of the dolly, adhesive, coating system, and substrate, and will be exposed by the fracture surface. This test method maximizes tensile stress as compared to the shear stress applied by other methods, such as scrape or knife adhesion, and results may not be comparable. The scrape test is typically limited to testing on smooth, flat surfaces. Adhesion is determined by pushing the coated surfaces beneath a rounded stylus or loop that is loaded in increasing amounts until the coating is removed from the substrate surface.

Adhesion is also a measurable result of some hardness tests made by pencil hardness, gravelometer, impact (falling object, etc.) or mandrel bend as indicated by chipping off of the coating. Finally, loss of adhesion can be noted during some chemical resistance tests where the coating blisters, bubbles up or even falls off.

Abrasion resistance can be determined by air-blasting silicon carbide grains, known as the ablative, at the coated test panel at a flow rate of approximately 45 g/min. The ablating continues until the coating is worn through, and the quantity of ablative used to reach break through is determined. The abrasion resistance is designated as the grams of ablative per 25.4 µm film thickness. A similar test involves dropping a silica or silicon carbide abrasive through a tube from a specified height onto a coated planar surface using gravity flow. Silica (sand) is a milder abrasive than silicon carbide and its slower rate of abrasion can be used to differentiate between different coatings. The falling sand test uses gravity flow rather than forced air flow and results in the slower rate of ablation. The abrasion resistance for the falling sand test is designated as the volume (liters) of sand per mil (25.4 µm) film thickness. In one embodiment, the compositions described herein yield a coating with a falling sand abrasion resistance greater than 100 liters/mil.

Scratch resistance testing is a comprehensive method of quantifying the adhesion properties of a wide range of coatings. The technique involves generating a controlled scratch with a diamond tip on the sample under test. The tip, either a diamond or a sharp metal tip, is drawn across the coated surface under either a constant or progressive load. At a certain critical load the coating will start to fail. The critical loads can be detected very precisely by means of an acoustic sensor attached to the indenter holder, the frictional force and by optical microscopy. Once known the critical loads are used to quantify the adhesive properties of different films/substrate combinations and these parameters constitute a unique signature of the coating system under test.

The pencil hardness test method is a procedure for rapid, inexpensive determination of the film hardness of an organic coating on a substrate by pushing pencil leads of known hardness across a coated test panel. Grading pencils come in an assortment of both hard and soft, ranging in hardness from 9H to 9B. The 'H' stands for hardness, the 'B' stands for blackness, and HB is for hard and black pencils. The hardest pencil is a 9H, followed by 8H, 7H, 6H, 5H, 4H, 3H, 2H, and H. The middle of the hardness scale is F; then HB, B, 2B, 3B, 4B, 5B, 6B, 7B, 8B, and 9B, which is the softest. The hardness of some coatings is such that a 9H pencil will not scratch them; however these coatings still receive a 9H rating to designate their hardness. In the pencil hardness test method a coated test panel is placed on a firm horizontal surface and the pencil, held at a 45° angle, is pushed away from the operator in a ¼ inch (6.5 mm) stroke. The process is started with the hardest pencil and continued down the scale of hardness to either of two end points; one, the pencil that will not cut into or gouge the film (pencil hardness), or two, the pencil that will not scratch the film (scratch hardness).

There are a variety of corrosion resistance requirements which an effective coating must fulfill. The corrosion resistance testing evaluations include: salt spray, scab, and cycle corrosion evaluations and any associated creepback. The testing method for evaluating salt spray corrosion involves mounting the test panels in a temperature-controlled chamber, and then spraying the test panel with an aqueous solution of salt or salt mixtures in the form of a fine aerosol. Typically, the solution is a 5% salt (sodium chloride) solution, although the methods can vary according to chamber temperature and the composition of the salt solution. The test panels are inserted into the chamber and the salt solution is sprayed as a very fine fog mist over the samples at a constant temperature. Since the spray is continual, the samples are constantly wet, and thus, constantly subject to corrosion. The samples may be rotated frequently to ensure uniform exposure to the salt spray mist. Test duration can be from 24 to 480 hours, or longer. Enhanced corrosion resistance may be evidenced by exposure of a test panel for at least 400 hours without developing any significant evidence of under-film corrosion, such as blistering or other changes in appearance which may result from pin holes in the coating. In general, the maximum allowable creepback is 2–4 mm along with at least less than 10% of the surface being corroded within 2–4 mm of sharp edges. A more rigorous test involves exposure for at least 900 hours without developing any significant evidence of under-film corrosion, such as blistering or other changes in appearance, with the maximum allowable creepback being 2–4 mm and at least less than 10% of the surface being corroded within 2–4 mm of sharp edges.

Scab corrosion testing involves the use of the salt spray procedure however the test panel is scribed such that a scratch is created in the coating. Scab-like corrosion then occurs along the scratch in a coating and manifests itself as a blister like appearance emanating away from the scratch. Enhanced corrosion resistance for scab corrosion may be demonstrated in that after 1 week the test panel exhibits no blistering or surface corrosion, or other change in appearance, with is a maximum creepback of up to 2 mm, and at least less than 10% of the surface is corroded within 3 mm of sharp edges. A more rigorous test involves exposure of a scribed test panel for up to 2 weeks without showing evidence of scab corrosion.

Evaluation of coated surfaces using procedures that involve continual exposure to moisture (as occurs in the salt spray test) may not emulate realistic conditions experienced by the coated surface, which in reality will experience periods of wet and dry environments. Therefore evaluation of a coating using wet/dry cycles, with and without salt spray during the wet cycle, is a more realistic evaluation for daily use of a coating. The continual wetness during the salt spray test does not allow this passive oxide layer to develop.

A "cure" test is used to evaluate completeness of curing, the coating adhesion strength to the surface, and solvent resistance. The procedure used is to take a test panel, coat it with the test sample and then cure according using the cure method of choice, such as actinic radiation. The coated and cured test panel is then subject to rubbing to evaluate the number of rubs needed to expose the surface. Failure normally is determined by a breakthrough to the substrate surface. Generally, the cloth used to rub the surface is also soaked in an organic solvent such as methyl ethyl ketone (MEK) as a means to accelerate testing conditions and test for stability to solvent exposure. One rub is considered to be one back and forth cycle, and highly solvent resistant coating achieve a rating of more than 100 double rubs. In addition, a secondary reading for the cure test may also be obtained by determining at what point a marring of the surface occurs.

For evaluation of the heat resistance of a coating, a coated test panel is placed in an oven and evaluated for loss of adhesion, cracking, crazing, fading, hazing, or fogging after various periods of thermal exposure. The types of ovens used include, but are not limited to, convection ovens. The UV-curable, corrosion resistant coating described herein may meet or exceed requirements for heat resistance with no loss of adhesion and no cracking, crazing, fading, hazing, or fogging after least 1 hour held at, at least 210° C., and at least 10 hrs held at, at least 210° C.

Along with corrosion testing, a coating undergoes a number of other evaluation criteria, resistance to chipping evaluation, and thermal shock testing. Resistance to chipping testing is primarily used to simulate the effects of the impact of flying debris on the coating of a surface. Typically a Gravelometer, which has been designed to evaluate the resistance of surface coatings (paint, clear coats, metallic plating, etc.) to chipping caused by the impacts of gravel or other flying objects. In general, the test sample is mounted in the back of the Gravelometer, and air pressure is used to hurl approximately 300 pieces of gravel, hexagonal metal nuts, or other angled objects at the test panel. The test sample is then removed, gently wiped with a clean cloth, and then tape is applied to the entire tested surface. Removal of the tape then pulls off any loose fragments of the coating. The appearance of the tested sample is then compared to standards to determine the chipping ratings, or visual examination can also be used. Chipping ratings consist of a number which designates the number of chips observed.

Thermal shock testing is the most strenuous temperature test, designed to show how the product will perform as it expands and contracts under extreme conditions. Thermal shock testing creates an environment that will show in a short period of time how a coating would behave under adverse conditions throughout years of change. Several variants of testing include the resiliency of a coating to rapidly changing temperatures, such as that experienced in winter when moving from a warm environment, such as a house, garage or warehouse, into the freezing, cold environment outside, or vice versa. Such thermal shock tests have a rapid thermal ramp rate (30° C. per minute) and can be either air-to-air or liquid-to-liquid shock tests. Thermal Shock Testing is at the more severe end on the scale of temperature tests and is used for testing coatings, packaging, aircraft parts, military hardware or electronics destined to rugged duty. Most test items undergo air-to-air thermal shock testing where the test product moves from one extreme atmospheric temperature to another via mechanical means. Fully enclosed thermal shock test chambers can be used to avoid unintended exposure to ambient temperature, whereby minimizing the thermal shock. In Thermal Shock testing the cold zone of the chamber can be maintained at −54° C. (−65° F.) and the hot zone can be set for 160° C. (320° F.). The test panels is held at each stage for at least an hour and then moved back and forth between stages in a large number of cycles. The number of Thermal Shock cycles can vary from 10 or 20 cycles, up to 1500 cycles. The UV-curable, corrosion resistant coating described herein may meet and exceed the Thermal Shock testing requirement in which no loss of adhesion, cracking, crazing, fading, hazing, or fogging is observed for up to 20 cycles.

Other mechanical properties of the coating which may be tested include tensile strength, flexibility, cupping, and elongation at failure.

Flexibility testing methods are used to assess the resistance of a coating to cracking and/or detachment from a flexible substrate when a coated substrate is bent. Flexibility is usually measured by a mandrel bend test or a T-bend test. The mandrel bend test involves bending a coated substrate, usually sheet metal or rubber-type materials, over either a conical mandrel or over cylindrical mandrels of various diameters. The standard, smooth-steel, conical mandrel has a length of 203 mm (8 in) and a diameter of 3 mm (0.125 in) at one end and 38 mm (1.5 in) at the other end. The coated substrate, coating side up, is bent around the mandrel with a lever device and the extent of cracking, if it exists, is determined. The distance from the small end of the mandrel to the crack is determined visually and can be used graphically to determine the percent elongation. (However, there is no indication in the test method that elongation determined from tensile studies will yield a value related to the cracking-failure point.) The mandrel diameter at the point where cracking ceases is reported as the resistance to cracking resistance or flexibility. The cylindrical mandrel test is a pass/fail test that involves placing the coated substrate over a mandrel, coating side up, and bending the specimen about 180° around the mandrel by hand at a uniform velocity in a specified time. Usually six mandrels having diameters ranging from 25 mm (1.0 in) to 3.2 mm (0.125 in) are used. The panel is bent over the largest diameter mandrel and then immediately examined for cracking. If none occurs, the next smaller mandrel is used and so on until failure occurs or the smallest diameter mandrel has been passed. The smallest diameter at which cracking does not occur is reported. The test can be used to calculate coating elongation.

The T-bend test involves placing a coated metal panel with a 50 mm (2 in) minimum width in a smooth jaw bench vise and holding it firmly. The panel must be sufficiently long that the needed number of bends can be made, i.e. about 150 mm (6 in). Then the panel is bent 90° with the coating on the outside of the bend, removed, and further bent by hand until the bent end can be inserted in the vise; the vise is tightened to complete the 180° bend. The apex end of the bend should be as flat as possible. This is termed a 0T (zero-T) bend. The bend is then examined with a 5 to 10 power magnifier for cracks and pressure-sensitive tape is applied and removed to determine if coating can be picked off. The process is then repeated by placing the bent end in the vise and bending through 180° around the 0T bend, forming the 1T bend. This is continued for 2T, 3T, etc. bends. The lowest T bend at which no cracks are visible and there is no pick off of coating is the value reported. Note that the radius of curvature of the bend increases with each succeeding bend and coating elongation required to make the bend decreases with each succeeding bend. In one embodiment, a composition described herein yields a coating with a flexibility up to about 2T.

Cupping tests are carried out on coatings applied to flexible substrates. Cupping is potentially a more severe test than the mandrel bend test. In the cupping test, deformation of the panel can be taken to the point where the metal fractures, which does not normally happen during mandrel tests. The method involves sandwiching a coated metal panel is between a hemispherical die and a hemispherical indenter. Pressure is applied to the indenter so as to form a dome shape in the panel with the coating on the convex side. The pressure is increased either to a specified depth or until the coating cracks and/or detaches from the substrate.

Tensile strength, which is the resistance of a material to a force tending to tear it apart and is measured as the maximum tension the material can withstand without tearing. The tensile strength is generally measured on detached coatings, but can be evaluated on coated substrates. A tensile tester usually incorporates a highly sensitive electronic load weighing system with load cells employing strain gauges to detect the load applied to the specimen under test. The test specimen is clamped between two grips one of which is attached to a load cell in a moving crosshead, while the other grip is fixed to the base of the tester. The crosshead is attached to two vertically mounted screws which are rotated using a synchronous motor-gearbox assembly. The load applied to the test specimen and the distance traveled by the crosshead are both displayed on a chart recorder.

Elongation is the deformation that results from the application of a tensile force and is calculated as the change in length divided by the original length. Elongation is a measurement used to determine how far a piece of film will stretch before it breaks. This information useful in developing a coating to stretch around a corner of a piece of wood, a piece of metal that will be formed into a V-shaped object or must be bent 360° around a bottle, pipe or piece of thread without cracking. The test method involves conditioning a detached test film under specified temperature and humidity conditions, and then cutting the test specimens into known dimensions. A specimen is then clamped between two grips and elongated until it ruptures. The rate of elongation may vary from between 5 and 100 percent per minute.

EXAMPLES

Example 1

Formulation for Clear Coat Composition.

An embodiment for a clear coat composition to yield flexible coatings with excellent abrasion resistance, scratch resistance, corrosion resistance and adhesion properties is prepared by mixing, with a helical mixer, 25.683% of an aliphatic urethane triacrylate (EBECRYL® 264, from UCB Surface Specialties, Brussels, Belgium), 18.032% 2-phenoxyethyl acrylate, 26.229% isobornyl acrylate, 8.743% methacrylate ester derivative adhesion promoter (EBECRYL® 168, from UCB Surface Specialties, Brussels, Belgium), 14.210% of propoxylated glyceryl triacrylate-nanosilica (Nanocryl® (C-155, formerly Nanocryl®XP 21 0953, from hanse chemie AG, Geesthacht, Germany), 5.464% of DARACUR® 1173 (from Ciba Specialty Chemicals 540 White Plains Road, Tarrytown, N.Y., U.S.A.), and 1.639% of ESACURE® KTO-46 (from Lamberti S.p.A., Gallarate (VA), Italy). These components are thoroughly mixed by the helical mixer until a smooth composition is produced. This composition is applied by HVLP and cured by UV light.

Example 2

Formulation for Black Pigmented Composition.

An embodiment for a pigmented composition to yield flexible coatings with excellent abrasion resistance, scratch resistance, corrosion resistance and adhesion properties is prepared by mixing, with a helical mixer, 94.43% of the clear coat composition of Example 1, with 3.60% carbon black bonded to a modified acrylic (solid pigment dispersions, PC 9317 from Element is, Staines, UK), and 2.06% synthetic amorphous silica with organic surface treatment (SYLOID® RAD 221, from the Grace Davison division of WR Grace & Co., Columbia, Md., U.S.A.), to 94.34% of the clear coat composition described above. These additions are dispersed throughout the clear coating by a helical mixer until a smooth black coating composition is produced which may be applied by HVLP and cured by UV light.

Example 3

Procedure Used for Making Clear Flexible Coatings with Improved Abrasion Resistance, Scratch Resistance, Corrosion Resistance, and Adhesion Properties.

A further embodiment is the procedure used for making a clear coat composition. The components of the coatings composition are mixed under air, as the presence of oxygen prevents premature polymerization. It is desired that exposure light be kept to a minimum, in particularly the use of sodium vapor lights should be avoided. However, the use of darkroom lighting may be an option. The components used in the manufacture of the coating composition which come in contact with monomers and coating mixture, such as mixing vessels and mixing blades, should be made of stainless steel or plastic, preferably polyethylene or polypropylene. Polystyrene and PVC should be avoided, as the monomers and coating mixture will dissolve them. In addition, contact of the monomers and coating mixture with mild steel, alloys of copper, acids, bases, and oxidizers should be avoided. Furthermore, brass fittings must be avoided, as they will cause premature polymerization or gelling. For the manufacture of clear coatings it is only essential to obtain thorough mixing, and consequently the control of shear is not necessary. Adequate mixing of the clear coating composition can be obtained after 1–3 hours using a ⅓ horse power (hp) mixer and a 50 gallon cylindrical tank. Smaller quantities, up to 5 gallons, can be adequately mixed after 3 hours using a laboratory mixer (¹⁄₁₅–¹⁄₁₀ hp). Round walled vessels are desired as this avoids accumulation of solid oligomer in corners and any subsequent problems associated with incomplete mixing. Another, parameter is that the mixers blades should be placed off of the bottom of the mixing vessel, at a distance of one half of the diameter of the mixer. The oligomers are added to the mixing vessel first, and if necessary the oligomers are gently warmed to aid in handling. Oligomers should not be heated over 120° F., therefore if warming is needed the use of a temperature controlled heating oven or heating mantle is recommended. Band heaters should be avoided. Monomers and colloidal suspensions are added next, in any order, followed by the ester/monomer adhesion promoters. Photoinitiators are added last to ensure that the time the complete composition is exposed to light is minimized. With the mixing vessel shielded from light exposure the mixing is then carried out after all the components are added. After mixing, there are air bubbles present and the coating may appear cloudy. These bubbles rapidly dissipate, leaving a clear coating composition. As a final step, prior to removing the coating composition from the mixing vessel, the bottom of the mixing vessel is scraped to see if any un-dissolved oligomer is present. This is done as a precaution to ensure thorough mixing has taken place. If the composition is thoroughly mixed then the coating composition is filtered through a 1 micron filter using a bag filter. The composition is then ready for use.

Example 4

Procedure Used for Making Pigmented Flexible Coatings with Improved Abrasion Resistance, Scratch Resistance, Corrosion Resistance, and Adhesion Properties.

A further embodiment is the manufacture procedure for pigmented coatings. Here a mixer of sufficient power and configuration is used to create laminar flow and efficiently bring the pigment dispersions against the blades of the mixer. For small laboratory quantities below 400 mLs, a laboratory mixer or blender is sufficient, however for quantities of up to half of a gallon a $1/15$–$1/10$ hp laboratory mixer can be used, but mixing will take several days. For commercial quantities, a helical or saw-tooth mixer of at least 30 hp with a 250 gallon round walled, conical bottomed tank may be used. To make a pigmented composition a clear coating composition is mixed first, see Example 4. The pigment dispersion mixtures are premixed prior to addition to the clear coat composition as this ensures obtaining the correct color. The premixing of the pigments dispersions is easily achieved by shaking the pigments dispersion in a closed container, while wearing a dust mask. The fillers, the premixed pigments/pigment dispersions, and solid photoinitiator are then added to the clear coat composition and mixed for 1½ to 2 hours. Completeness of mixing is determined by performing a drawdown and checking for undissolved pigment. This is accomplished by drawing off a small quantity of the pigmented mixture from the bottom of the mixing tank and applying a thin coating onto a surface. This thin coating is then examined for the presence of any pigment which had not dissolved. The mixture is then run through a 100 mesh filter. A thoroughly mixed pigmented coating composition will show little or no undissolved pigment.

Example 5

Process for Coating the External Surface of Leaf Springs with Clear Flexible Coatings with Improved Abrasion Resistance, Scratch Resistance, Corrosion Resistance, and Adhesion Properties.

Still another embodiment is the process for coating the external surface of leaf springs with an actinic radiation curable, substantially all solids composition as described in example 1. The process begins by attaching a leaf spring to a rotatable spindle, and then attaching this combination to a conveyer belt system. The leaf spring may be pre-cleaned using a biodegradable organic cleaner at a separate Cleaning Station or the leaf spring may be pre-cleaned prior to attachment onto the rotatable spindle. Note that rotation of the rotatable spindle/leaf spring assembly during the coating procedure ensures a complete coating of the leaf spring surface. The rotatable spindle/leaf spring assembly is then moved via the conveyer belt system into the coating application section, locating the rotatable spindle/leaf spring assembly in the vicinity of electrostatic spraying system. The electrostatic spraying system has three spray heads arranged to ensure top, bottom and side coverage of the object being coated. Rotation of the spindle/leaf spring assembly begins prior to spraying of the coating composition from the three spray heads. The coating composition is then applied simultaneously from the three electrostatic spray heads, while the spindle/leaf spring assembly continues to rotate. The coated spindle/leaf spring assembly is then transported by the conveyer belt into a curing chamber located further down the process line. The curing chamber has two sets of doors which are closed during curing to protect operators form exposure to UV radiation. Inside the curing chamber the three sets of UV lamps are arranged to ensure top, bottom and side exposure to the UV radiation. Furthermore each UV lamp set contains two separate lamp types; one a mercury arc lamp and the other a mercury arc lamp doped with iron, to ensure proper curing. Therefore there are actually six lamps with in the curing chamber. Note that this three dimensional curing can be achieved by using only two lamps, one a mercury arc lamp and the other a mercury arc lamp doped with iron, with a mirror assembly to ensure exposure to the top, bottom and sides. Once inside the curing chamber the doors close and the spindle/leaf spring assembly is again rotated. The mercury arc lamp doped with iron is then activated for the partial curing stage, and then the mercury arc lamp is activated for full cure. Note that the mercury arc lamp doped with iron does not need to be completely off before the mercury arc lamp is turned on, and the time of exposure to the doped mercury arc lamp is less than the time of exposure to the pure mercury arc lamp. Both lamps are turned off and rotation of the spindle/leaf spring assembly is stopped. The doors on the other side of the curing chamber are opened and the fully cured leaf spring with a clear, flexible, adherent, abrasion resistant, scratch resistant, and corrosion resistant coating is then moved via the conveyer belt to a packaging area away from the curing chamber. The leaf spring is then removed from the rotatable spindle, packed and shipped.

Example 6

Process for Coating the External Surface of Leaf Springs with a Pigmented, Flexible Coatings with Improved Abrasion Resistance, Scratch Resistance, Corrosion Resistance, and Adhesion Properties.

Still another embodiment is the process for coating the external surface of leaf springs with an actinic radiation curable, substantially all solids composition as described in example 2. The process begins by attaching a leaf spring to a rotatable spindle, and then attaching this combination to a conveyer belt system. The leaf spring may be pre-cleaned using a biodegradable organic cleaner at a separate Cleaning Station or the leaf spring may be pre-cleaned prior to attachment onto the rotatable spindle. Note that rotation of the rotatable spindle/leaf spring assembly during the coating procedure ensures a complete coating of the leaf spring surface. The rotatable spindle/leaf spring assembly is then moved via the conveyer belt system into the coating application section, locating the rotatable spindle/leaf spring assembly in the vicinity of electrostatic spraying system. The electrostatic spraying system has three spray heads arranged to ensure top, bottom and side coverage of the object being coated. Rotation of the spindle/leaf spring assembly begins prior to spraying of the coating composition from the three spray heads. The coating composition is then applied simultaneously from the three electrostatic spray heads, while the spindle/leaf spring assembly continues to rotate. The coated spindle/leaf spring assembly is then transported by the conveyer belt into a curing chamber located further down the process line. The curing chamber has two sets of doors which are closed during curing to protect operators form exposure to UV radiation. Inside the curing chamber the three sets of UV lamps are arranged to ensure top, bottom and side exposure to the UV radiation. Furthermore each UV lamp set contains two separate lamp types; one a mercury arc lamp and the other a mercury arc lamp doped with iron, to ensure proper curing. Therefore there are actually six lamps with in the curing chamber. Note that this three dimensional curing can be achieved by using only two lamps, one a mercury arc lamp and the other a mercury arc lamp doped with iron, with a mirror assembly to ensure exposure to the top, bottom and sides. Once inside the curing chamber the doors close and the spindle/leaf spring assembly is again rotated. The mercury arc lamp doped with iron is then activated for the partial curing stage, and then the mercury arc lamp is activated for full cure. Note that the mercury arc lamp doped with iron does not need to be completely off before the mercury arc lamp is turned on, and the time of exposure to the doped mercury arc lamp is less than the time of exposure to the pure mercury arc lamp. Both lamps are turned off and rotation of the spindle/leaf spring assembly is stopped. The doors on the other side of the curing chamber are opened and the fully cured leaf spring with a black, flexible, adherent, abrasion resistant, scratch resistant, and corrosion resistant coating is then moved via the conveyer belt to a packaging area away from the curing chamber. The leaf spring is then removed from the rotatable spindle, packed and shipped.

Example 7

Adhesion Testing of Pigmented, Flexible Coatings with Improved Abrasion Resistance, Scratch Resistance, Corrosion Resistance, and Adhesion Properties.

A further embodiment is testing the adhesion stability of the cured coating on a leaf spring, coated as described in Example 6, obtained from the UV-curable coating composition described in Example 2. The adhesion is evaluated after maintaining the coated leaf spring at 110 F. in 100% humidity for 10 days. The adhesion test is conducted using a cross-hatched adhesion test, wherein the cross hatch tape test uses a cross-hatch pattern obtained from a special cross-hatch cutter with multiple preset blades to ensure the incisions are properly spaced and parallel. The cuts are made through the coating down to the underlying surface. Pressure sensitive tape is applied and removed over the cuts made in the coating, and the tape is then pulled off the cut area and inspected for any removed coating. The coating obtained from the composition described in example 2 shows 99+% adhesion after 10 days at 110 F. in 100% humidity.

All percentages given are by weight. EBECRYLs® are available from UCB Surface Specialties, Brussels, Belgium. SYLOIDs® are available from the Grace Davison division of WR Grace & Co., Columbia, Md., U.S.A. Cited solid pigment dispersions are available from Elementis, Staines, UK. DAROCUR® photoinitiators are available® from Ciba Specialty Chemicals 540 White Plains Road, Tarrytown, N.Y., U.S.A. ESACUREs® are available from Lamberti S.p.A., Gallarate (VA) Italy. Nanocryls® are available from hanse chemie AG, Geesthacht, Germany).

While the invention has been described in connection with certain embodiments, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An actinic radiation curable, substantially all solids composition consisting essentially of a mixture of about 15–45% percent by weight an oligomer or a multiplicity of oligomers, about 25–65% by weight of a monomer or a multiplicity of monomers, about 2–10% by weight of a photoinitiator or a multiplicity of photoinitiators, about 0.1–25% by weight of a nano-filler or a multiplicity of nano-fillers, up to about 5% by weight of a filler or a multiplicity of fillers, and up to about 10% by weight of a polymerizable pigment dispersion or a multiplicity of polymerizable pigment dispersions, wherein the cured composition exhibits 99+% adhesion after 10 days at 110° F. in 100% humidity and/or a 180 degree bend around a mandrel; and wherein the composition has a viscosity suitable for application to a surface using spraying without the addition of heat.

2. The actinic radiation curable, substantially all solids composition of claim 1, wherein the at least one oligomer is selected from a group consisting of a urethane acrylate, an aliphatic urethane acrylate, an aliphatic urethane triacrylate/monomer blend, an aliphatic urethane triacrylate blended with 1, 6-hexanediol acrylate, a hexafunctional urethane acrylate, a siliconized urethane acrylate, an aliphatic siliconized urethane acrylate, a polyether acrylate, and combinations thereof.

3. The actinic radiation curable, substantially all solids composition of claim 1, wherein the at least one monomer is selected from a group consisting of a trimethylolpropane triacrylate, a 2-phenoxyethyl acrylate, an isobornyl acrylate, a propoxylated glyceryl triacrylate, an acrylate ester derivative, a methacrylate ester derivative, a tripropylene glycol diacrylate, an acrylate ester derivative and combinations thereof.

4. The actinic radiation curable, substantially all solids composition of claim 1, wherein the at least one photoinitiator is selected from a group consisting of diphenyl (2, 4, 6-trimethylbenzoyl) phosphine oxide, benzophenone, 1-hydroxycyclohexyl phenyl ketone, 2-hydroxy-2-methyl-1-phenyl-propan-1-one, 2,4,6-trimethylbenzophenone, 4-methylbenzophenone, oligo (2-hydroxy-2-methyl-1-(4-(1-methylvinyl)phenyl)propanone), and combinations thereof.

5. The actinic radiation curable, substantially all solids composition of claim 1, further comprising up to about 2% of a co-photoinitiator selected from a group consisting of an amine acrylate, thioxanthone, dimethyl ketal, benzyl methyl ketal, and combinations thereof.

6. The actinic radiation curable, substantially all solids composition of claim 1, wherein at least one filler comprises particles and is selected from a group consisting of amorphous silicon dioxide prepared with polyethylene wax, synthetic amorphous silica with organic surface treatment, and combinations thereof.

7. The actinic radiation curable, substantially all solids composition of claim 6 wherein the average size of the filler particles is less than 10 micrometers.

8. The actinic radiation curable, substantially all solids composition of claim 1, wherein the at least one nano-filler comprises particles and is selected from a group consisting of nano-aluminum oxide, nano-silicon dioxide, nano-zirconium oxide, nano-zirconium dioxides, nano-silicon carbide, nano-silicon nitride, nano-sialon, nano-aluminum nitride, nano-bismuth oxide, nano-cerium oxide, nano-copper oxide, nano-iron oxide, nano-nickel titanate, nano-niobium oxide, nano-rare earth oxide, nano-silver oxide, nano-tin oxide, and nano- titanium oxide, and combinations thereof.

9. The actinic radiation curable, substantially all solids composition of claim 1, wherein the polymerizable pigment dispersions are comprised of at least one pigment attached to an activated resin.

10. The actinic radiation curable, substantially all solids composition of claim 9, wherein the activated resin is selected from a group consisting of an acrylate resin, a methacrylate resin, and a vinyl resin.

11. The actinic radiation curable, substantially all solids composition of claim 10, wherein the pigment is selected from a group consisting of carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red.

12. The actinic radiation curable, substantially all solids composition of claim 1 wherein the composition is suitable for coating a flexible metal object.

13. The actinic radiation curable, substantially all solids composition of claim 1, wherein the composition coats at least a portion of a surface of a flexible metal object and the coating is uncured.

14. The actinic radiation curable, substantially all solids composition of claim 13, wherein the uncured coating has been applied to the surface by an electrostatic spraying apparatus.

15. The actinic radiation curable, substantially all solids composition of claim 14, wherein the uncured coating is applied in a single application.

16. A completely cured coated surface prepared by exposing the uncured coated surface of claim 14 to actinic radiation.

17. The actinic radiation curable, substantially all solids composition of claim 1, wherein the composition is curable with ultra-violet (UV) radiation selected from the group consisting of UV-A radiation, UV-B radiation, UV-B radiation, UV-C radiation, UV-D radiation, or combinations thereof.

18. An article of manufacture comprising the completely cured coated surface of claim 16.

19. An article of manufacture of claim 18, wherein the article of manufacture is a leaf spring.

* * * * *